(12) United States Patent
Son et al.

(10) Patent No.: US 11,803,262 B2
(45) Date of Patent: Oct. 31, 2023

(54) ELECTRONIC APPARATUS AND METHOD FOR MANUFACTURING THE SAME

(71) Applicant: Samsung Display Co., Ltd., Yongin-Si (KR)

(72) Inventors: Younghye Son, Yongin-si (KR); Sang-Gu Lee, Hwaseong-si (KR); Onnuri Kim, Hwaseong-si (KR); Junghoon Shin, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/130,798

(22) Filed: Dec. 22, 2020

(65) Prior Publication Data
US 2021/0303091 A1 Sep. 30, 2021

(30) Foreign Application Priority Data
Mar. 24, 2020 (KR) .................. 10-2020-0035766

(51) Int. Cl.
*G06F 3/041* (2006.01)
*G02B 5/30* (2006.01)

(52) U.S. Cl.
CPC ......... *G06F 3/0412* (2013.01); *G02B 5/3033* (2013.01); *G06F 2203/04103* (2013.01)

(58) Field of Classification Search
None
See application file for complete search history.

(56) References Cited

U.S. PATENT DOCUMENTS

| 9,690,024 B2 | 6/2017 | Jiao et al. | |
|---|---|---|---|
| 2015/0338672 A1* | 11/2015 | Fang | G06F 3/041 349/12 |
| 2016/0002506 A1* | 1/2016 | Mitamura | C09J 133/08 345/174 |
| 2016/0289515 A1* | 10/2016 | Clapper | B32B 27/36 |

(Continued)

FOREIGN PATENT DOCUMENTS

| CN | 110136573 A | 8/2019 |
|---|---|---|
| CN | 110208976 A | 9/2019 |

(Continued)

OTHER PUBLICATIONS

Extended European Search Report for Application No. 21159823.0-1210 dated Aug. 20, 2021 enumerating the above listed references.

(Continued)

*Primary Examiner* — Christopher R Lamb
(74) *Attorney, Agent, or Firm* — CANTOR COLBURN LLP

(57) ABSTRACT

An electronic apparatus includes an electronic module which outputs or receives a signal, an electronic panel that is divided into a first area overlapping the electronic module, a second area which surrounds at least a portion of the first area, and a third area adjacent to the second area in a plan view, a window on the electronic panel, an anti-reflection member between the window and the electronic panel, and an adhesive layer between the window and the anti-reflection member. A hole which overlaps at least a portion of the first area is defined in the anti-reflection member, and the adhesive layer fills the hole.

16 Claims, 16 Drawing Sheets

(56) References Cited

U.S. PATENT DOCUMENTS

| | | | |
|---|---|---|---|
| 2018/0011373 A1* | 1/2018 | Zhou | G02F 1/133528 |
| 2019/0148679 A1* | 5/2019 | Li | H01L 51/0097 |
| | | | 345/173 |
| 2019/0278132 A1* | 9/2019 | Nakamura | G02B 5/208 |
| 2019/0369787 A1* | 12/2019 | Park | G06F 3/044 |
| 2019/0384121 A1* | 12/2019 | Nishiwaki | G02F 1/133528 |
| 2021/0265596 A1* | 8/2021 | Lou | H01L 51/5225 |

FOREIGN PATENT DOCUMENTS

| | | | | |
|---|---|---|---|---|
| CN | 110783370 | * | 2/2020 | H01L 27/32 |
| KR | 101385042 B1 | | 4/2014 | |
| KR | 101459348 B1 | | 11/2014 | |
| KR | 1020170103159 A | | 9/2017 | |

OTHER PUBLICATIONS

Koyama, et al., "3D Shape Reconstruction of 3D Printed Transparent Microscopic Objects from Multiple Photographic mages Using Ultraviolet Illumination", Micromachines 2018, 9(6), 261, pp. 1-8.

* cited by examiner

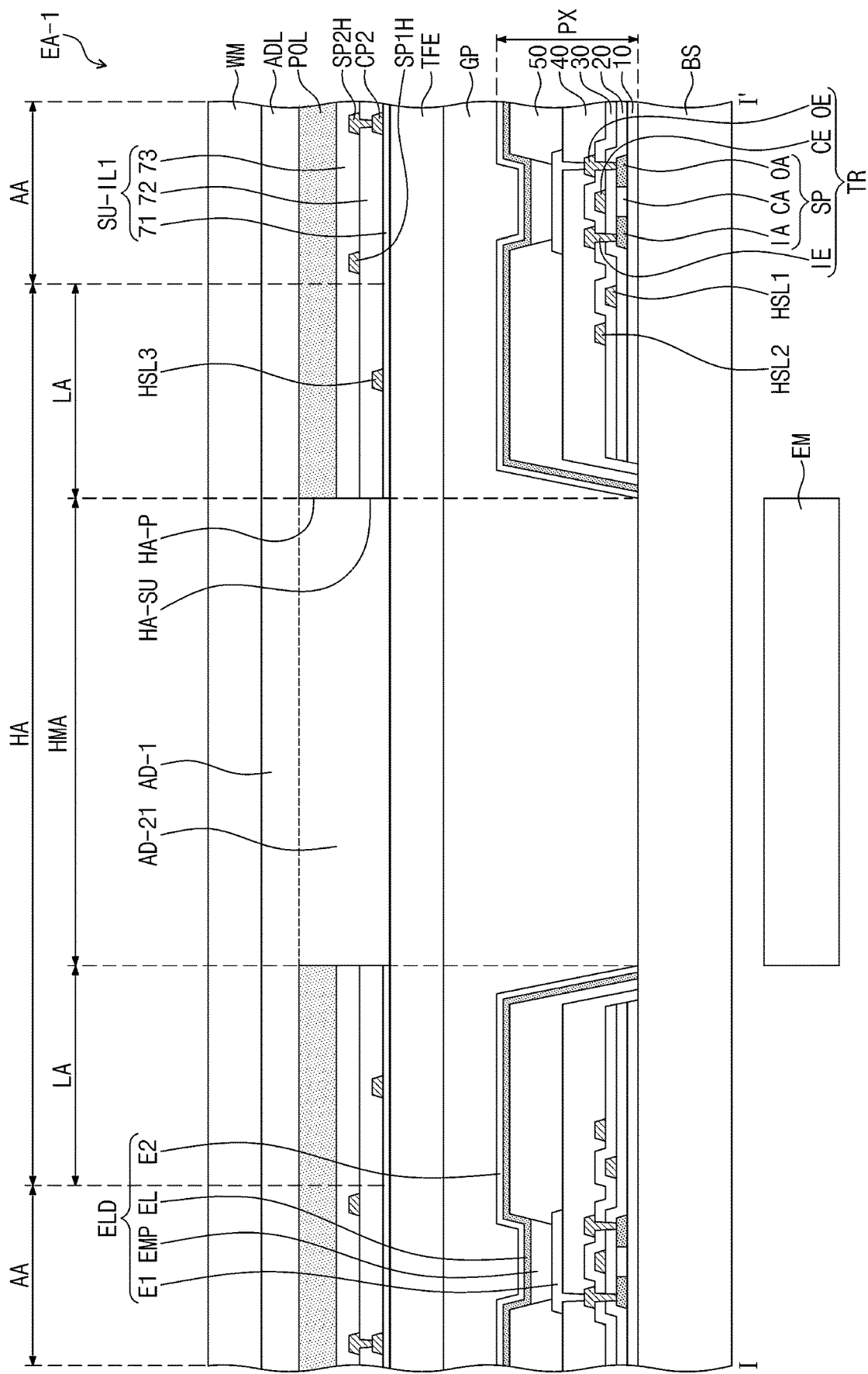

ELECTRONIC APPARATUS AND METHOD FOR MANUFACTURING THE SAME

This application claims priority to Korean Patent Application No. 10-2020-0035766, filed on Mar. 24, 2020, and all the benefits accruing therefrom under 35 U.S.C. § 119, the content of which in its entirety is herein incorporated by reference.

BACKGROUND

1. Field

Embodiments of the invention herein relate to an electronic apparatus and a method for manufacturing the same, and more particularly, to an electronic apparatus including an electronic module and a method for manufacturing the electronic apparatus having improved reliability.

2. Description of the Related Art

Electronic apparatuses are activated according to an electrical signal. The electronic apparatus may include a display unit that displays an image and a sensing unit that senses an external input. In the display unit, an organic light emitting display panel has various advantages such as low power consumption, high luminance, and a high response speed.

The electronic apparatus may include an electronic module that receives an external signal or provides an output signal to an outside. The electronic module is accommodated in an outer case or the like together with a display panel to constitute the electronic apparatus.

SUMMARY

Embodiments of the invention provide an electronic apparatus having a reduced bezel. Embodiments of the invention provide a method for manufacturing an electronic apparatus having improved process reliability.

An embodiment of the invention provides an electronic apparatus including an electronic module which outputs or receives a signal, an electronic panel that is divided into a first area overlapping the electronic module, a second area surrounding at least a portion of the first area, and a third area adjacent to the second area in a plan view, a window on the electronic panel, an anti-reflection member between the window and the electronic panel, and an adhesive layer between the window and the anti-reflection member, where a hole which overlaps at least a portion of the first area is defined in the anti-reflection member, and the adhesive layer fills the hole.

In an embodiment, the adhesive layer may include a first adhesive pattern through which the window and the anti-reflection member are attached, and a second adhesive pattern which fills the hole.

In an embodiment, a depth of the hole of the anti-reflection member and a thickness of the second adhesive pattern may be substantially the same.

In an embodiment, the first adhesive pattern and the second adhesive pattern may have a unitary shape.

In an embodiment, the adhesive layer may include an optically clear resin ("OCR").

In an embodiment, the adhesive layer may include an epoxy resin.

In an embodiment, the adhesive layer may further include a thermosetting agent.

In an embodiment, the electronic panel may include a base substrate, a plurality of pixels which is disposed on the base substrate and displays an image on the second area, and an encapsulation layer which is disposed on the base substrate and covers the plurality of pixels.

In an embodiment, the electronic panel may further include a plurality of insulating layers on the base substrate, and the plurality of insulating layers may overlap the second area and may not overlap the first area.

In an embodiment, the adhesive layer may contact a top surface of the encapsulation layer.

In an embodiment, the electronic panel may further include a sensing unit disposed on the encapsulation layer and including a plurality of conductive patterns and a plurality of sensing insulating layers disposed between the plurality of conductive patterns, and the sensing insulating layers may not overlap the first area in the plan view.

In an embodiment, the encapsulation layer may include a first inorganic layer, a second inorganic layer on the first inorganic layer, and an organic layer between the first inorganic layer and the second inorganic layer, where the first inorganic layer may not overlap the first area in the plan view.

In an embodiment, the adhesive layer may have a light transmittance equal to or greater than about 92 percent (%) in a wavelength range equal to or less than about 400 nanometers (nm).

In an embodiment of the invention, an electronic apparatus includes an electronic panel including a high transmission region and an active region surrounding at least a portion of the high transmission region in a plan view, a window on the electronic panel, an anti-reflection member between the window and the electronic panel, and a thermosetting adhesive resin layer between the window and the anti-reflection member, where a hole which overlaps at least a portion of the high transmission region is defined in the anti-reflection member, and the thermosetting adhesive resin layer fills the hole.

In an embodiment of the invention, a method for manufacturing an electronic apparatus includes preparing an electronic panel including a high transmission region and an active region surrounding at least a portion of the high transmission region, defining a hole in an anti-reflection member such that at least a portion of the hole overlaps the high transmission region, applying an adhesive resin to the anti-reflection member to fill the hole, and attaching a window to the anti-reflection member through the adhesive resin.

In an embodiment, the adhesive resin may include a thermosetting resin, and the attaching the window may include thermally curing the adhesive resin.

In an embodiment, the adhesive resin may further include a thermosetting agent.

In an embodiment, the applying the adhesive resin may be performed through an inkjet method.

In an embodiment, the electronic panel may include a base substrate and a plurality of insulating layers on the base substrate, and the preparing the electronic panel may include patterning the plurality of insulating layers overlapping the high transmission region.

In an embodiment, the patterning the plurality of insulating layers and the defining the hole of the anti-reflection member may be performed through a same process.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain principles of the invention. In the drawings:

FIGS. 5A to 5C are cross-sectional views of an embodiment of the electronic apparatus cording to an embodiment of the invention;

DETAILED DESCRIPTION

Figure 1A:
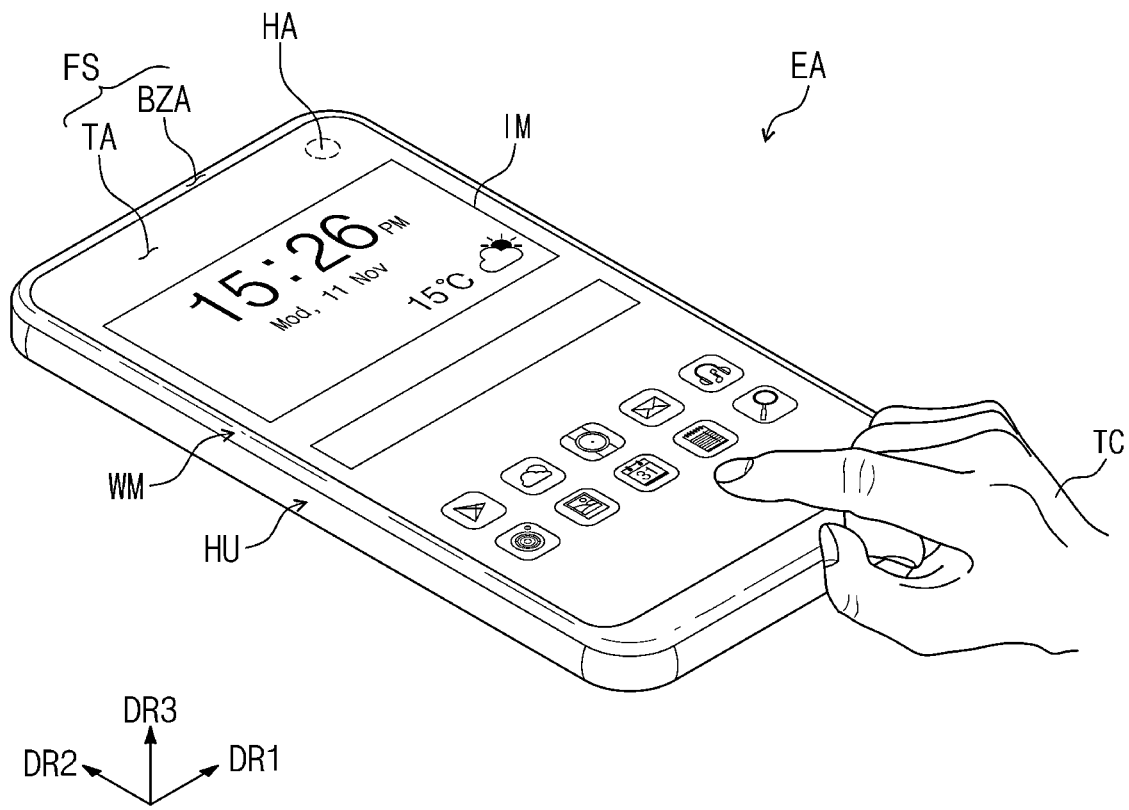
FIG. 1A is a perspective view illustrating an embodiment of coupling of an electronic apparatus according to the invention.

In this specification, it will also be understood that when one component (or region, layer, portion) is referred to as being "on", "connected to", or "coupled to" another component, it can be directly disposed/connected/coupled on/to the one component, or an intervening third component may also be present.

Like reference numerals refer to like elements throughout. Also, in the drawing figures, the thickness, ratio, and dimensions of components are exaggerated for clarity of illustration.

The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, an element referred to as a first element in one embodiment can be referred to as a second element in another embodiment without departing from the scope of the appended claims. The terms of a singular form may include plural forms unless referred to the contrary.

Also, "under", "below", "above", "upper", and the like are used for explaining relation association of components illustrated in the drawings. The terms may be a relative concept and described based on directions expressed in the drawings.

Unless otherwise defined, all terms (including technical and scientific terms) used herein have the same meaning as commonly understood by a person of ordinary skill in the art to which this invention belongs. Also, terms such as defined terms in commonly used dictionaries are to be interpreted as having meanings consistent with meaning in the context of the relevant art and are expressly defined herein unless interpreted in an ideal or overly formal sense.

The meaning of 'include' or 'comprise' specifies a property, a fixed number, a step, an operation, an element, a component or a combination thereof, but does not exclude other properties, fixed numbers, steps, operations, elements, components or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Hereinafter, an electronic apparatus and a method for manufacturing the same in an embodiment of the invention will be described with reference to the accompanying drawings.

Figure 1B:
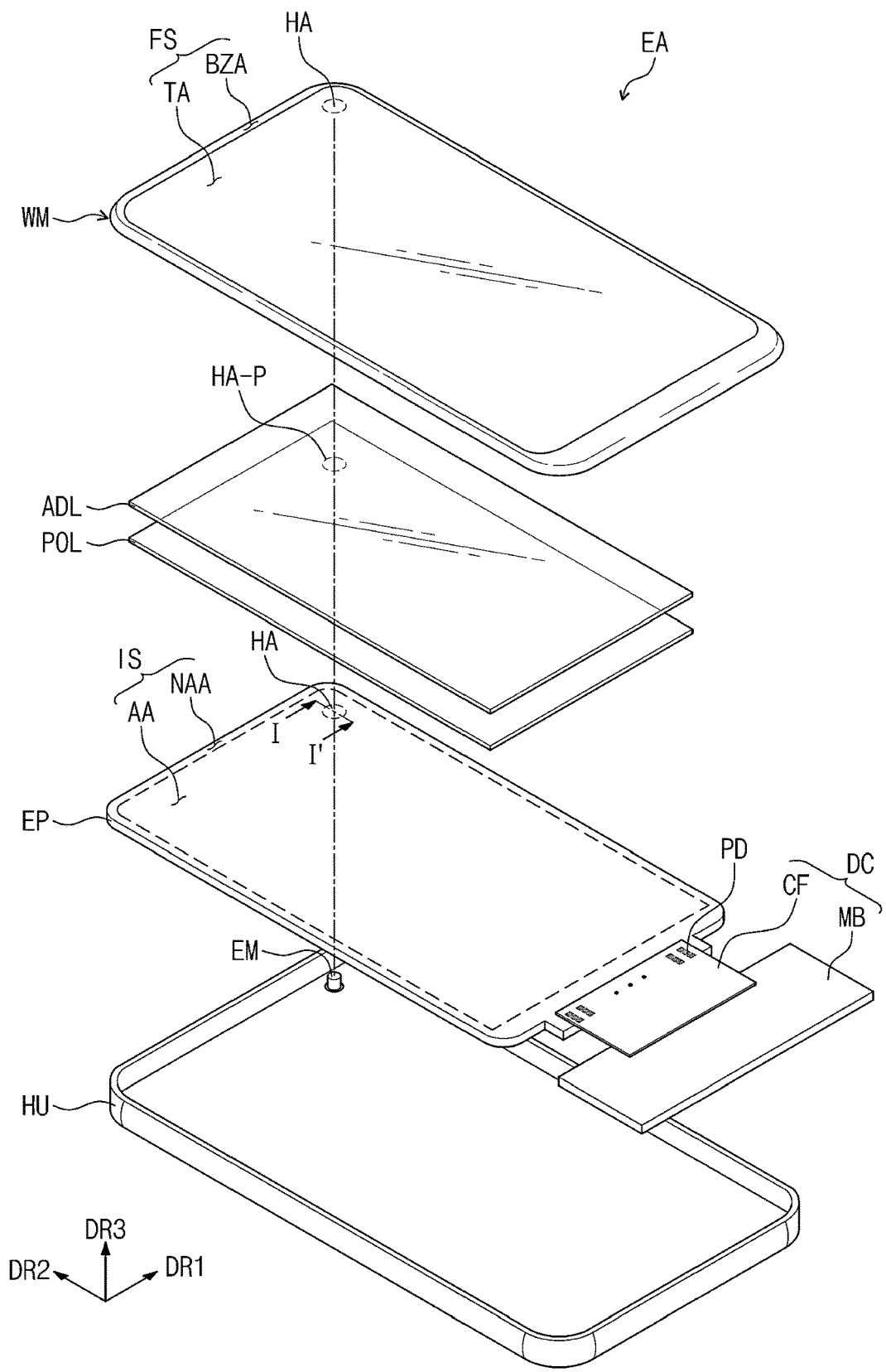
FIG. 1B is an exploded perspective view of the electronic apparatus of FIG. 1A.
Figure 2:
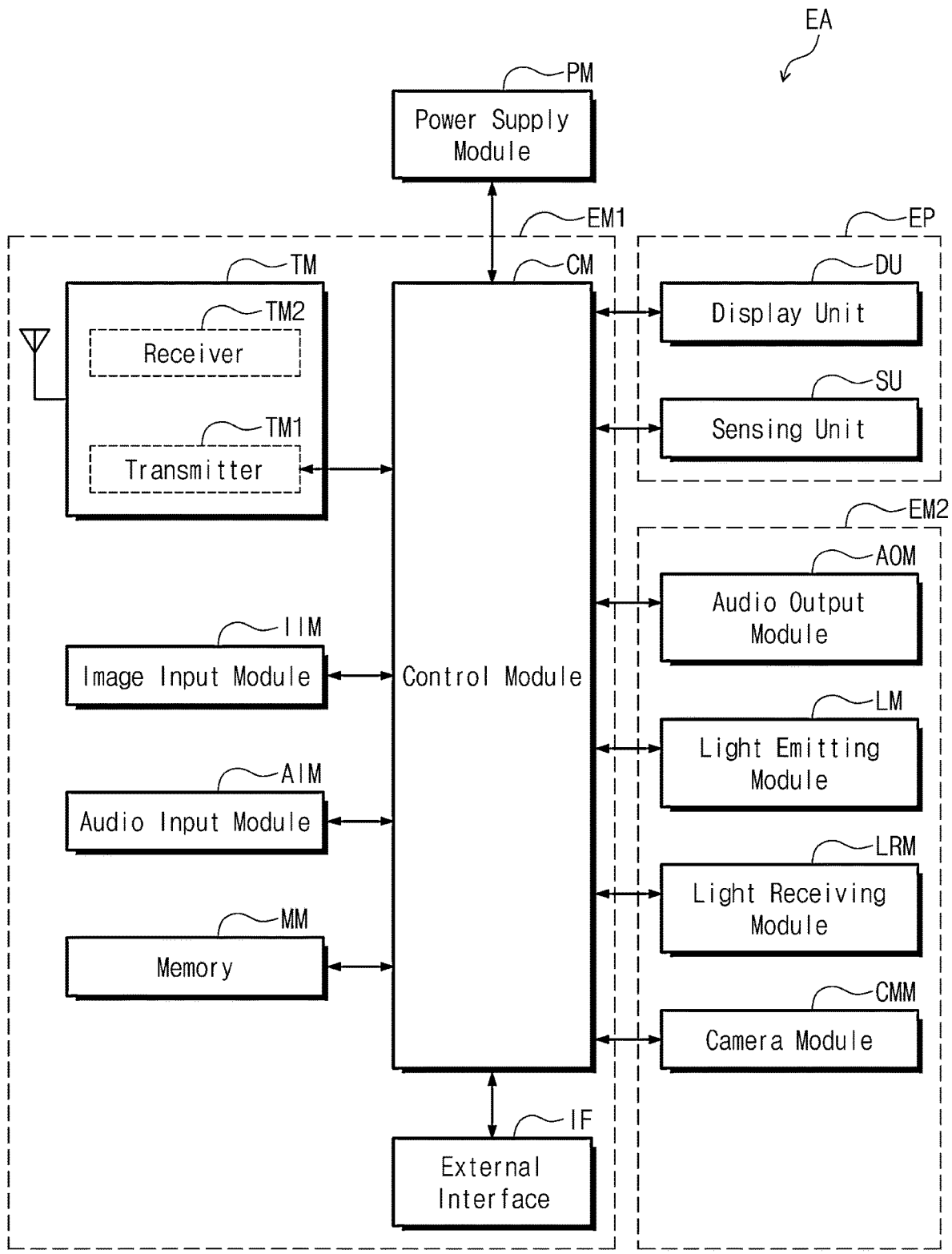
FIG. 2 is a block diagram of an embodiment of the electronic apparatus according to the invention.

FIG. 1A is a perspective view illustrating an embodiment of coupling of an electronic apparatus according to the invention. FIG. 1B is an exploded perspective view of the electronic apparatus of FIG. 1A. FIG. 2 is a block diagram of an embodiment of the electronic apparatus according to the invention. Hereinafter, embodiments according to the invention will be described with reference to FIGS. 1A to 2.

An electronic apparatus EA may be an apparatus that is activated according to an electrical signal. The electronic apparatus EA may include various examples. In an embodiment, the electronic apparatus EA may include a tablet, a notebook, a computer, a smart television, and the like, for example. In this embodiment, the electronic apparatus EA including a smart phone will be described as an example.

Referring to FIG. 1A, the electronic apparatus EA may display an image IM through a front surface FS. The front surface may be defined in parallel to a surface defined by a first direction DR1 and a second direction DR2. The front surface FS may include a transmission area TA and a bezel area BZA adjacent to the transmission area TA.

The electronic apparatus EA displays the image IM on the transmission area TA. The image IM may include at least one of a static image and a moving image. In FIG. 1A, the image IM is shown as a watch and a plurality of icons as an example.

The transmission area TA may have a quadrangular shape (e.g., rectangular shape that is parallel to the first direction DR1 and the second direction DR2). However, this is merely an example. In an embodiment, the electronic apparatus EA may have various shapes, for example, and is not limited to a specific embodiment.

The bezel area BZA is adjacent to the transmission area TA. The bezel area BZA may surround the transmission area TA. However, this is merely an example. In another embodiment, the bezel area BZA may be disposed adjacent to only one side of the transmission area TA or be omitted, for example. The electronic apparatus EA may include various embodiments, and is not limited to a specific embodiment.

A normal direction of the front surface FS may correspond to a thickness direction (hereinafter, also referred to as a third direction DR3) of the electronic apparatus EA. In this embodiment, a front surface (or a top surface) or a rear surface (or a bottom surface) of each of members may be defined based on a direction in which the image IM is displayed. The front and rear surfaces may be opposite to each other in the third direction DR3.

The directions indicated as the first to third directions DR1, DR2, and DR3 may be a relative concept and thus changed into different directions. Hereinafter, the first to third directions may be directions indicated by the first to third directions DR1, DR2, and DR3 and designated by the same reference numerals, respectively.

The electronic apparatus EA in an embodiment according to the invention may sense a user's input TC (hereafter, also referred to as "external input TC") applied from the outside. In an embodiment, the user's input TC includes various types of external inputs such as a portion of user's body, light, heat, a pressure, or the like, for example. Also, the electronic apparatus EA may sense not only an input contacting the electronic apparatus EA but also an approaching or adjacent input.

In this embodiment, the user's input TC is illustrated as a user's hand applied to the front surface FS. However, this is merely an example. In an embodiment, as described above, the user's input TC may be provided in various forms, for example. The electronic apparatus EA may sense the user's input TC applied to a side surface or the rear surface of the electronic apparatus EA according to a structure of the electronic apparatus EA, but is not limited to a specific embodiment.

The electronic apparatus EA may include a window WM, an electronic panel EP, an anti-reflection member POL, an adhesive layer ADL, a circuit board DC, an electronic module EM, and an outer case HU. The window WM and the outer case HU may be coupled to each other to define an outer appearance of the electronic apparatus EA.

The window WM is disposed on the electronic panel EP to cover a front surface IS of the electronic panel EP. The window WM may include an optically transparent insulating material. In an embodiment, the window WM may include glass or plastic, for example. The window WM may have a single layer or multilayered structure. In an embodiment, the window WM may have a laminated structure of a plurality of plastic films bonded to each other by an adhesive or a laminated structure of a glass substrate and a plastic film, which are bonded to each other by an adhesive, for example.

The window WM includes a front surface FS that is exposed to the outside. The front surface FS of the electronic apparatus EA may be substantially defined by the front surface FS of the window WM.

Particularly, the transmission area TA may be an optically transparent area. The transmission area TA may have a shape corresponding to that of the active region AA. In an embodiment, the transmission area TA overlaps an entire surface of at least a portion of the active region AA, for example. The image IM displayed on the active region AA of the electronic panel EP may be visible through the transmission area TA from the outside.

The bezel area BZA may have light transmittance (hereafter, also referred to as "transmittance") that is relatively less than that of the transmission area TA. The bezel area BZA defines a shape of the transmission area TA. The bezel area BZA may be disposed adjacent to the transmission area TA to surround the transmission area TA.

The bezel area BZA may have a predetermined color. When the window WM is provided as a glass or plastic substrate, the bezel area BZA may be a color layer that is printed or deposited on one surface of the glass or plastic substrate. In an alternative embodiment, the bezel area BZA may be formed by coloring a corresponding area of the glass or plastic substrate.

The bezel area BZA may cover the peripheral region NAA of the electronic panel EP to prevent the peripheral region NAA from being visible from the outside. However, this is merely an example. In an embodiment of the window WM of the invention, the bezel area BZA may be omitted, for example.

The electronic panel EP may display the image IM and sense the external input TC. The electronic panel EP includes a front surface IS including an active region AA and a peripheral region NAA. The active region AA may be a region that is activated according to an electrical signal.

In this embodiment, the active region AA may have an area on which the image IM is displayed, and also, the external input TC is sensed. The transmission area TA overlaps at least active region AA. In an embodiment, the transmission area TA overlaps an entire surface of at least a portion of the active region AA, for example. Thus, the user may see the image IM or provide the external input TC through the transmission area TA. However, this is merely an example. In an embodiment, an area of the active region AA, on which the image IM is displayed, and an area of the active region AA, on which the external input TC is sensed, may be separated from each other, for example, but is not limited to a specific embodiment.

The peripheral region NAA may be an area covered by the bezel area BZA. The peripheral region NAA is adjacent to the active region AA. The peripheral region NAA may surround the active region AA. A driving circuit or a driving line for driving the active region AA may be disposed in the peripheral region NAA.

Various signal lines providing an electrical signal to the active region AA, pads PD, or electronic elements may be disposed in the peripheral region NAA. The peripheral region NAA may be covered by the bezel area BZA and thus may not be visible from the outside.

In this embodiment, the electronic panel EP may be assembled in a state in which the active region AA and the peripheral region NAA are flat to face the window WM. However, this is merely an example. In an embodiment, a portion of the peripheral region NAA of the electronic panel EP may be bent, for example. Here, a portion of the peripheral region NAA may face a rear surface of the electronic apparatus EA to reduce the bezel area BZA on the front surface FS of the electronic apparatus EA. In an alternative embodiment, the electronic panel EP may be assembled in a state in which a portion of the active region AA is bent. In an alternative embodiment of the electronic panel EP, the peripheral region NAA may be omitted.

The anti-reflection member POL may be disposed between the window WM and the electronic panel EP. The anti-reflection member POL reduces a reflectance of external light incident from the outside of the window WM (hereinafter, also referred to as external light) to the electronic panel EP. In this embodiment, the anti-reflection member POL may include a polarizing film. In an alternative embodiment, the anti-reflection member POL may include a color filter. When the anti-reflection member POL includes the color filter, the color filter may be directly disposed on the electronic panel EP in a continuous process.

An adhesive layer ADL is disposed between the anti-reflection member POL and the window WM. The adhesive layer ADL bonds the anti-reflection member POL to the window WM. The adhesive layer ADL may include an optically clear resin.

A hole HA-P may be defined in the anti-reflection member POL in an embodiment of the invention. The hole HA-P may be defined in a position corresponding to a high transmission region HA of the electronic panel EP, which will be described later. The hole HA-P may overlap at least a portion of the high transmission region HA of the electronic panel EP. The hole HA-P may have a transmittance greater than that of the surrounding. Hereinafter, the description of the anti-reflection member POL and the adhesive layer ADL will be described later in more detail in FIGS. 4A and 4B.

Referring to FIGS. 1A, 1B, and 2, the electronic panel EP may include a display unit DU and a sensing unit SU. The display unit DU may substantially generate the image IM. The image IM generated by the display unit DU may be visible from the outside by the user through the transmission area TA.

The sensing unit SU senses the external input TC applied from the outside. As described above, the sensing unit SU may sense the external input TC provided to the window WM.

A predetermined high transmission region HA (or first area) may be defined on the electronic panel EP. The high transmission region HA may have a relatively high transmittance with respect to the same area when compared to that of the active region AA (or second area). Specifically, a central region serving as a path of light received by the electronic module EM among the high transmission region HA may have the highest transmittance. This will be described later in detail.

The high transmission region HA is defined at a position overlapping the electronic module EM described later in the plan view. The high transmission region HA may be a region that overlaps with a main body such as a body or housing constituting the electronic module EM, in addition to a portion of the electronic module EM, which receives or outputs light.

The high transmission region HA may be variously defined in shape. In this embodiment, for ease of explanation, the high transmission region HA is illustrated as having a circular shape, but is not limited thereto. In an embodiment, the high transmission region HA may have various shapes with an oval, polygonal, curved, and straight-line side, for example, but is not limited to a specific embodiment.

At least a portion of the high transmission region HA may be surrounded by the active region AA. In this embodiment, the high transmission region HA is spaced from the peripheral region NAA (or the third area). The high transmission region HA is illustrated as being defined inside the active region AA so that all edges are surrounded by the active region AA. In the coupled state of the electronic apparatus EA in this embodiment, the high transmission region HA may be defined at a position overlapping the transmission area TA and spaced apart from the bezel area BZA.

The circuit board DC may be connected to the electronic panel EP. The circuit board DC may include a flexible board CF and a main board MB. The flexible board CF may include an insulating film and conductive lines disposed (e.g., mounted) on the insulating film. The conductive lines are connected to the pads PD to electrically connect the circuit board DC to the electronic panel EP.

In this embodiment, the flexible board CF may be assembled in a bent state. Thus, the main board MB may be disposed on a rear surface of the electronic panel EP so as to be stably accommodated in a space provided by the outer case HU. In this embodiment, the flexible board CF may be omitted. Here, the main board MB may be directly connected to the electronic panel EP.

The main board MB may include signal lines (not shown) and electronic elements. The electronic elements may be connected to the signal lines so as to be electrically connected to the electronic panel EP. The electronic elements generate various electrical signals, for example, a signal for generating the image IM or a signal for sensing the external input TC or process the sensed signal. The main board MB may be provided in plural corresponding to electrical signals to be generated and processed, but is not limited to a specific embodiment.

In the electronic apparatus EA in an embodiment of the invention, the driving circuit that provides an electrical signal to the active region AA may be directly disposed (e.g., mounted) on the electronic panel EP. Here, the driving circuit may be disposed (e.g., mounted) in the form of a chip or may be provided together with pixels PX (referring to FIG. 3A) to be described. Here, the circuit board DC may be reduced in area or omitted. The electronic apparatus EA in an embodiment of the invention may be implemented according to various embodiments, but is not limited to a specific embodiment.

The electronic module EM is disposed below the window WM. The electronic module EM may overlap the high transmission region HA in the plan view. The electronic module EM may receive an external input TC transmitted through the high transmission region HA or provide an output through the high transmission region HA. In an embodiment according to the invention, the electronic module EM may overlap the active region AA, thereby preventing the bezel area BZA from increasing.

Referring to FIG. 2, the electronic apparatus EA may include an electronic panel EP, a power supply module PM, a first electronic module EM1, and a second electronic module EM2. The electronic panel EP, the power supply module PM, the first electronic module EM1, and the second electronic module EM2 may be electrically connected to each other. In FIG. 2, the display unit DU and the sensing unit SU of the electronic panel EP are illustrated as an example.

The first electronic module EM1 and the second electronic module EM2 may include various functional modules for driving the electronic apparatus EA. The first electronic module EM1 may be directly disposed (e.g., mounted) on a mother board electrically connected to the electronic panel EP or may be disposed (e.g., mounted) on a separate board and electrically connected to the mother board through a connector (not shown).

The first electronic module EM1 may include a control module CM, a wireless communication module TM, an image input module IIM, an audio input module AIM, a memory MM, and an external interface IF. A portion of the modules may not be disposed (e.g., mounted) on the mother board but electrically connected to the mother board through a flexible circuit board.

The control module CM controls the overall operation of the electronic apparatus EA. The control module CM may be a microprocessor. In an embodiment, the control module CM may activate or inactivate the electronic panel EP, for example. The control module CM may control other modules such as the image input module IIM or the audio input module AIM on the basis of a touch signal received from the electronic panel EP.

In an embodiment, the wireless communication module TM may transmit/receive a wireless signal to/from the other terminal by Bluetooth or Wi-Fi link, for example. The wireless communication module TM may transmit/receive an audio signal by a general communication link. The wireless communication module TM includes a transmitter TM1 modulating and transmitting a signal to be transmitted and a receiver TM2 demodulating the received signal.

The image input module IIM processes the image signal to convert the processed image signal into image data that is capable of being displayed on the electronic panel EP. The audio input module AIM receives external audio signals by a microphone during recording mode or a voice recognition mode to convert the received audio signal into electrical sound data.

The external interface IF serves as an interface connected to an external charger, a wired/wireless data port, and a card socket (for example, a memory card and a subscriber identity module/user identification module ("SIM/UIM") card).

The second electronic module EM2 may include an audio output module AOM, a light emitting module LM, a light receiving module LRM, and a camera module CMM. The above-described constituents may be directly disposed (e.g., mounted) on the mother board, may be disposed (e.g., mounted) on a separate board and electrically connected to the electronic panel EP through a connector (not shown), or may be electrically connected to the first electronic module EM1.

The audio output module AOM converts audio data received from the wireless communication module TM or audio data stored in the memory MM to output the converted audio data to the outside.

The light emitting module LM generates and outputs light. The light emitting module LM may output infrared rays. In an embodiment, the light emitting module LM may include a light emitting diode ("LED") element, for example. In an embodiment, the light receiving module LRM may sense infrared rays, for example. The light receiving module LRM may be activated when infrared rays having a predetermined level or more is sensed. In an embodiment, the light receiving module LRM may include a complementary metal-oxide-semiconductor ("CMOS") sensor, for example. The infrared rays generated in the light emitting module LM may be outputted and then be reflected by an external subject (for example, a user's finger or face), and the reflected infrared rays may be incident into the light receiving module LRM. The camera module CMM photographs an external image.

The electronic module EM in an embodiment of the invention may include at least one of constituents of the first electronic module EM1 and the second electronic module EM2. In an embodiment, the electronic module EM may include at least one of a camera, a speaker, an optical detection sensor, and a thermal detection sensor, for example. The electronic module EM may sense an external subject received through the high transmission region HA or provide a sound signal such as a voice to the outside through the high transmission region HA. Also, the electronic module EM may include a plurality of constituents, but is not limited to a specific embodiment.

In the electronic module EM overlapping the high transmission region HA, the external subject may be easily visible through the high transmission region HA, or an output signal generated by the electronic module EM may be easily transmitted to the outside. Although not shown, the electronic apparatus EA in an embodiment of the invention may further include a transparent member disposed between the electronic module EM and the electronic panel EP. The transparent member may be an optically transparent film so that the external input TC transmitted through the high transmission region HA passes through the transparent member and is transmitted to the electronic module EM. The transparent member may be attached to the rear surface of the electronic panel EP or be disposed between the electronic panel EP and the electronic module EM without an adhesion layer. The electronic apparatus EA in an embodiment of the invention may have various shapes, but is not limited to a specific embodiment.

In an embodiment according to the invention, the electronic module EM may be assembled to overlap the transmission area TA in the plan view. Therefore, an increase in the bezel area BZA due to the reception of the electronic module EM is prevented to improve the aesthetics of the electronic apparatus EA.

Figure 3A:
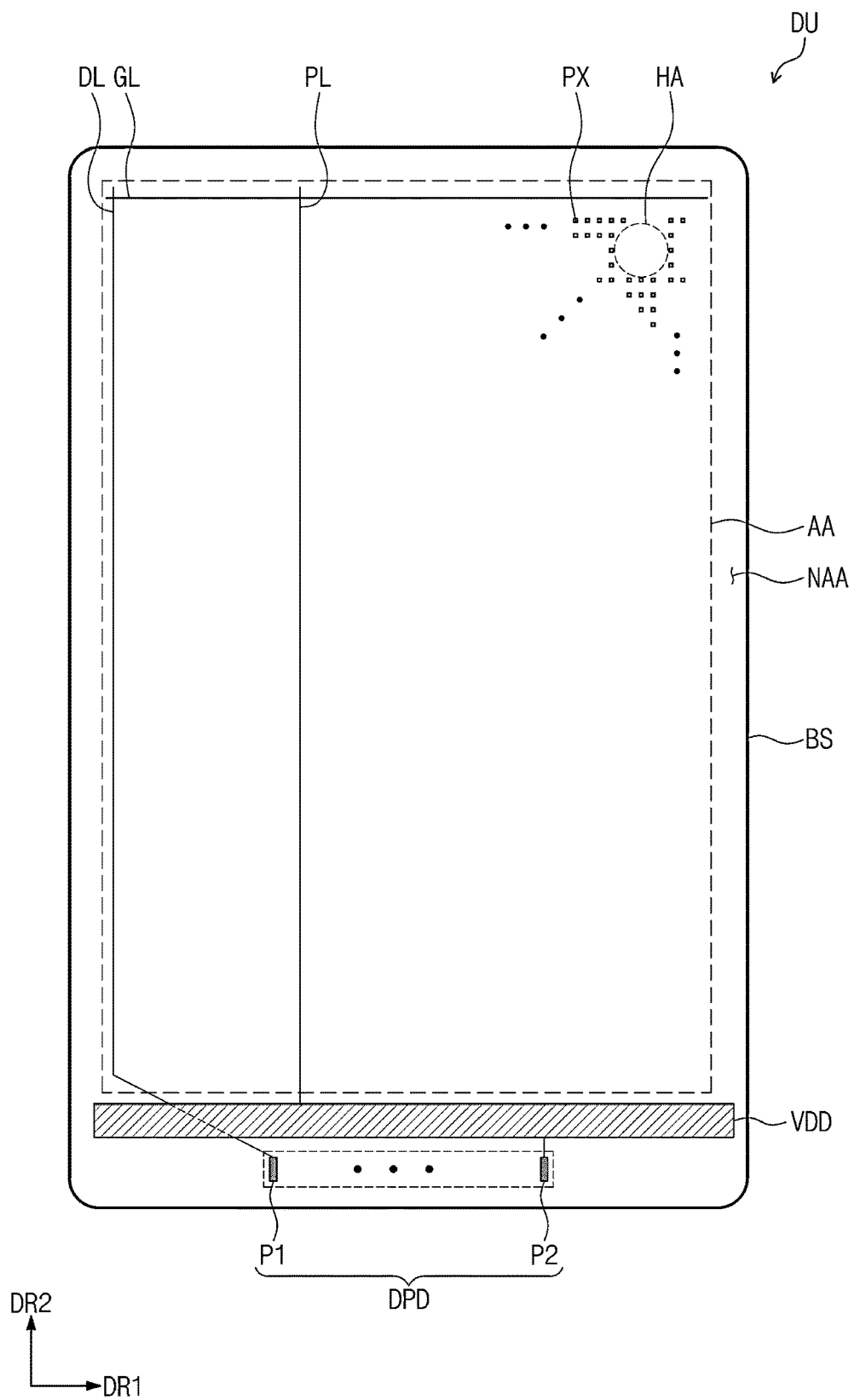
FIG. 3A is a plan view of an embodiment of a display unit according to the invention.
Figure 3B:
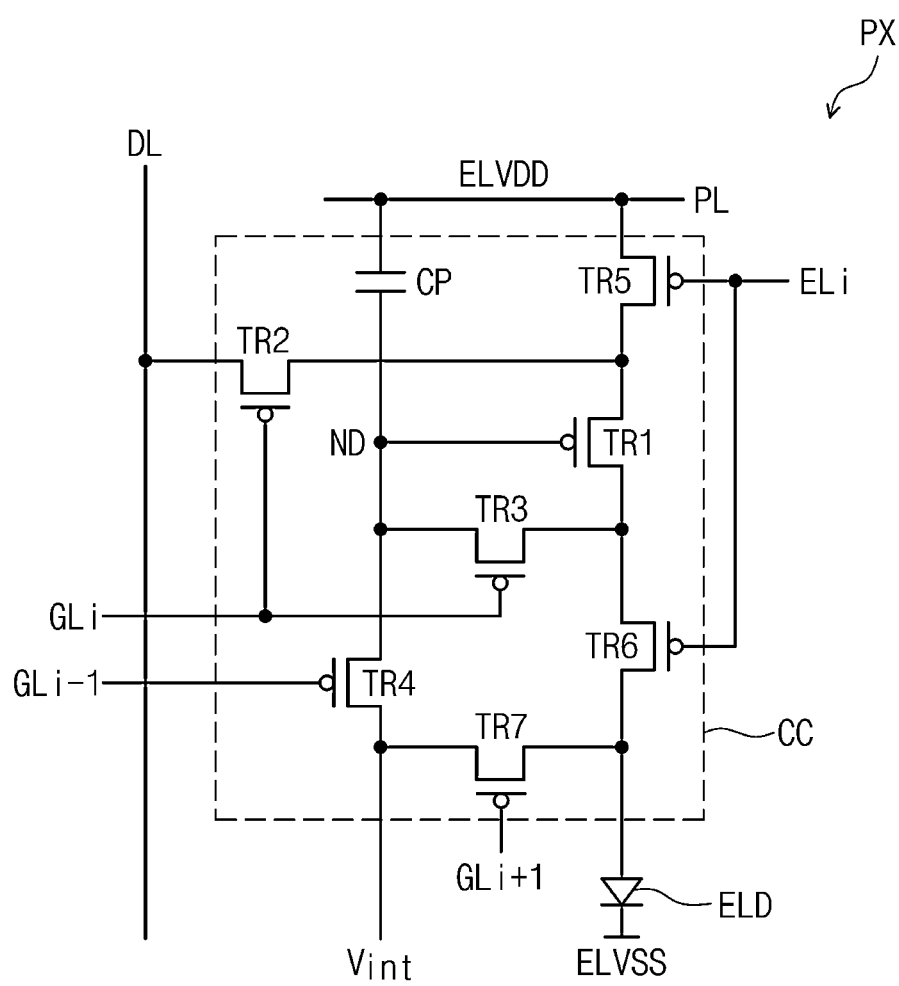
FIG. 3B is a plan view of an embodiment of a sensing unit according to the invention.

FIG. 3A is a plan view of an embodiment of the display unit according to the invention. FIG. 3B is a plan view of an embodiment of the sensing unit according to the invention. Hereinafter, embodiments of the invention will be described with reference to FIGS. 3A and 3B. The same reference numeral may be given to components that are the same as those of FIGS. 1A, 1B, to 2, and their detailed descriptions will be omitted.

As illustrated in FIG. 3A, the display unit DU includes a base substrate BS, a plurality of pixels PX, a plurality of signal lines GL, DL, and PL, a power pattern VDD and a plurality of display pads DPD.

An active region AA and the peripheral region NAA may be regions provided by the base substrate BS. The base substrate BS may include an insulating substrate. In an embodiment, the base substrate BS may include glass, plastic, or a combination thereof, for example.

In an alternative embodiment, the base substrate BS may include a metal substrate. The base substrate BS may be flexible so as to be foldable by the user or may be rigid to prevent the shape from being deformed. The base substrate BS in an embodiment of the invention may include various embodiments as long as configurations such as the pixels PX or the signal lines GL, DL, and PL are be arranged, but it is not limited to a specific embodiment.

The signal lines GL, DL, and PL are connected to the pixels PX to transmit electrical signals to the pixels PX. In FIG. 3A, a scan line GL, a data line DL, and a power line PL of the signal lines GL, DL, and PL, which are included in the display unit DU, are illustrated as an example. However, the signal lines GL, DL, and PL may further include at least one of an initialization voltage line, and an emission control line, and are not limited to a specific embodiment. Also, in FIG. 3A, for convenience, one scan line GL, one data line DL, and one power line PL among the signal lines GL, DL, and PL are exemplarily illustrated, but are not limited thereto. Each of the scan line GL, the data line DL, and the power line PL may transmit electrical signals to a plurality of pixel rows and pixel columns.

The pixels PX may be disposed in the active region AA. Referring to FIG. 3B, a signal circuit diagram of one pixel PX of the plurality of pixels PX is illustrated to be enlarged as an example. FIG. 3B illustrates an example of the pixel PX connected to an i-th scan line GLi and an i-th emission control line ELi, where i is a natural number.

The pixel PX may include a light emitting element ELD and a pixel circuit CC.

The pixel circuit CC may include a plurality of transistors TR1 to TR7 and a capacitor CP. In an embodiment, the plurality of transistors TR1 to TR7 may be provided through a low temperature polycrystalline silicon ("LTPS") process or a low temperature polycrystalline oxide ("LTPO") process, for example.

The pixel circuit CC may control an amount of current flowing in the light emitting element ELD in response to a data signal. The light emitting element ELD may emit light having predetermined luminance corresponding to an amount of current supplied from the pixel circuit CC. For this, the first power source ELVDD may be set to a level greater than that of the second power source ELVSS. The light emitting element ELD may include an organic light emitting element or a quantum dot light emitting element.

Each of the plurality of transistors TR1 to TR7 may include an input electrode (or a source electrode), an output electrode (or a drain electrode), and a control electrode (or a gate electrode). In this specification, for convenience, either the input electrode or the output electrode may be referred to as a first electrode and the other may be referred to as a second electrode.

The first electrode of the first transistor TR1 is connected to a first power source ELVDD via the fifth transistor TR5, and the second electrode of the first transistor TR1 is connected to an anode electrode of the light emitting element ELD via the sixth transistor TR6. The first transistor TR1 may be referred to as a driving transistor in this specification.

The first transistor TR1 may control an amount of current flowing in the light emitting element ELD according to a voltage applied to the control electrode of the first transistor TR1.

The second transistor TR2 is connected between the data line DL and the first electrode of the first transistor TR1. Also, the control electrode of the second transistor TR2 is connected to the i-th scan line GLi. When an i-th scan signal is applied to the i-th scan line GLi, the second transistor TR2 may be turned on to electrically connect the data line DL to the first electrode of the first transistor TR1.

The third transistor TR3 is connected between the second electrode of the first transistor TR1 and the control electrode of the first transistor TR1. The control electrode of the third transistor TR3 is connected to the i-th scan line GLi. When the i-th scan signal is provided to the i-th scan line GLi, the third transistor TR3 is turned on to electrically connect the second electrode of the first transistor TR1 to the control electrode of the first transistor TR1. Thus, when the third transistor TR3 is turned on, the first transistor TR1 is connected in the form of a diode.

The fourth transistor TR4 is connected between a node ND and an initialization power generation unit (not shown). Also, the control electrode of the fourth transistor TR4 is connected to an (i−1)-th scan line GLi−1. When an (i−1)-th scan signal is provided to the (i−1)-th scan line GLi−1, the fourth transistor TR4 is turned on to provide an initialization voltage Vint to the node ND.

The fifth transistor TR5 is connected between the power line PL and the first electrode of the first transistor TR1. The control electrode of the fifth transistor TR5 is connected to the i-th emission control line ELi.

The sixth transistor TR6 is connected between the second electrode of the first transistor TR1 and the anode electrode of the light emitting element ELD. Also, the control electrode of the sixth transistor TR6 is connected to the i-th emission control line ELi.

The seventh transistor TR7 is connected between the initialization power generation unit (not shown) and the anode electrode of the light emitting element ELD. Also, the control electrode of the seventh transistor TR7 is connected to an (i+1)-th scan line GLi+1. When the (i+1)-th scan signal is provided to the (i+1)-th scan line GLi+1, the seventh transistor TR7 is turned on to provide the initialization voltage Vint to the anode electrode of the light emitting element ELD.

The seventh transistor TR7 may improve black display capability of the pixel PX. Particularly, when the seventh transistor TR7 is turned on, a parasitic capacitor (not shown) of the light emitting element ELD is discharged. Thus, when black luminance is implemented, the light emitting element ELD does not emit light due to leakage current from the first transistor TR1, and thus, the black display performance may be improved.

Additionally, although the control electrode of the seventh transistor TR7 is connected to the (i+1)-th scan line GLi+1 in FIG. 3B, the invention is not limited thereto. In another embodiment of the invention, the control electrode of the seventh transistor TR7 may be connected to the i-th scan line GLi or the (i−1)-th scan line GLi−1.

The capacitor CP is disposed between the power line PL and the node ND. The capacitor CP stores a voltage corresponding to the data signal. When the fifth transistor TR5 and the sixth transistor TR6 are turned on according to the voltage stored in the capacitor CP, an amount of current flowing through the first transistor TR1 may be determined.

In the invention, an equivalent circuit of the pixel PX is not limited to the equivalent of FIG. 3B. In another embodiment of the invention, the pixel PX may have various shapes to allow the light emitting element ELD to emit light. Although a p-channel metal-oxide semiconductor ("PMOS") is illustrated in FIG. 3B, the invention is not limited thereto. In another embodiment of the invention, the pixel circuit CC may be constituted by an n-channel metal-oxide semiconductor ("NMOS"). In further another embodiment of the invention, the pixel circuit CC may be constituted by a combination of the NMOS and the PMOS.

Referring back to FIG. 3A, the pixels PX are disposed around the high transmission region HA. In this embodiment, a boundary between the high transmission region HA and the active region AA may have a closed line shape. In this embodiment, the boundary between the high transmission region HA and the active region AA is illustrated as a circular shape.

The power pattern VDD is disposed on the peripheral region NAA. In this embodiment, the power pattern VDD is connected to the plurality of power lines PL. Thus, the display unit DU may include the power pattern VDD to provide the same first power signal to each of the plurality of pixels PX.

The display pads DPD may include a first pad P1 and a second pad P2. The first pad P1 may be provided in plural, and the plurality of first pads P1 may be connected to the data lines DL, respectively. The second pad P2 may be connected to the power pattern VDD and electrically connected to the power line PL. The display unit DU may provide electrical signals provided from the outside to the pixels PX through the display pads DPD. The display pads DPD may further include pads for receiving other electrical signals in addition to the first pad P1 and the second pad P2, but are not limited to a specific embodiment.

Figure 3C:
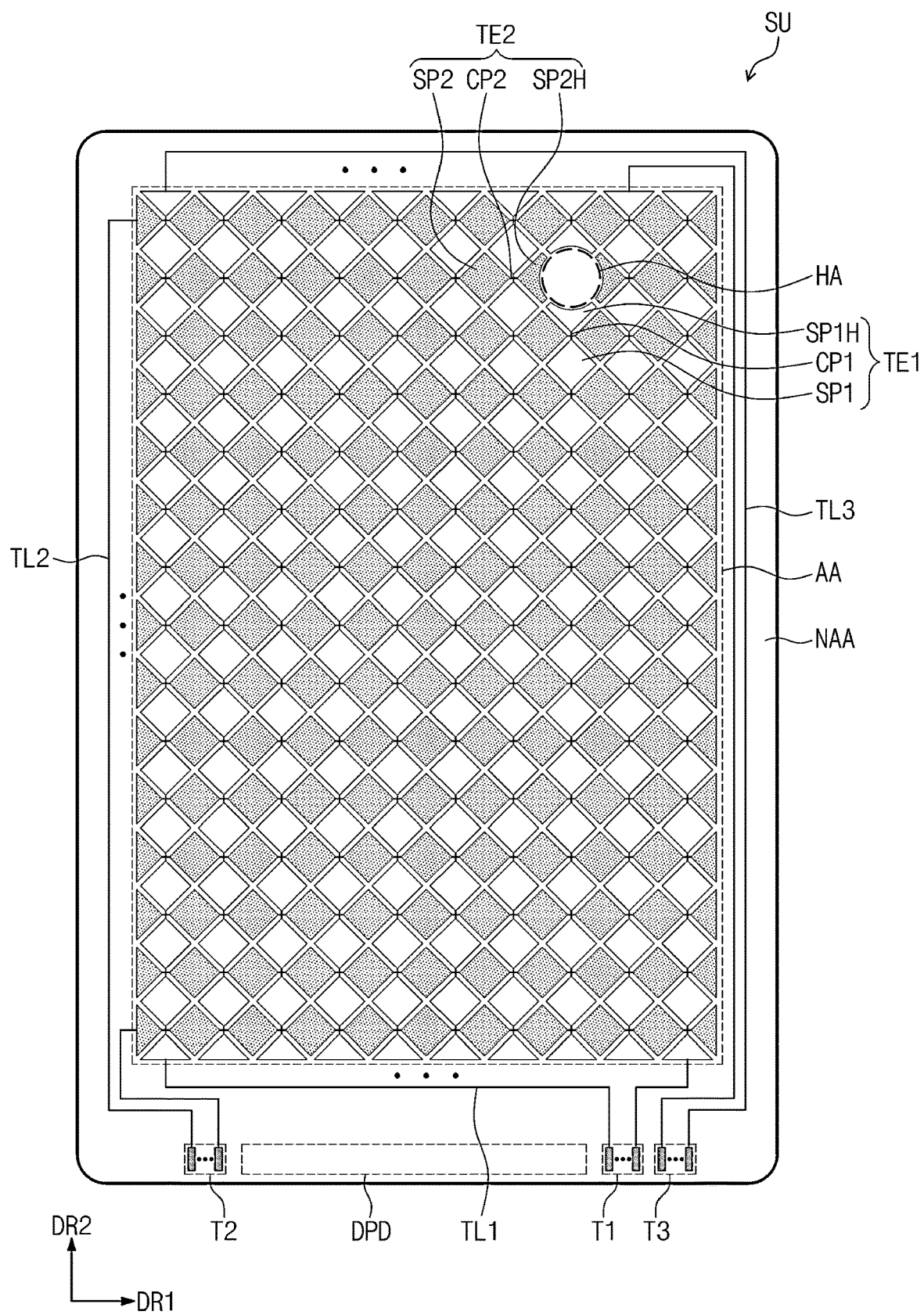
FIG. 3C is a plan view of an embodiment of a sensing unit according to the invention.

Referring to FIG. 3C, the sensing unit SU is illustrated in a shape corresponding to that of the display unit DU. In this embodiment, the sensing unit SU may be disposed on the display unit DU. However, this is merely an example, and thus, the sensing unit SU may be disposed under the display unit DU or may be embedded in the display unit DU and is not limited to a specific embodiment.

The sensing unit SU may sense the external input TC (refer to FIG. 1A) to obtain position or intensity information of the external input TC. The sensing unit SU includes a plurality of first sensing electrodes TE1, a plurality of second sensing electrodes TE2, a plurality of sensing lines TL1, TL2, and TL3, and a plurality of sensing pads T1, T2, and T3.

First sensing electrodes TE1 and second sensing electrodes TE2 may be disposed in the active region AA. The sensing units SU may obtain information on the external input TC through a change in capacitance between the first sensing electrodes TE1 and the second sensing electrodes TE2.

The first sensing electrodes TE1 are arranged in the first direction DR1 and extend in the second direction DR2. Each of the first sensing electrodes TE1 may include a first main pattern SP1, a first adjacent pattern SP1H, and a first connection pattern CP1.

The first main pattern SP1 is disposed in the active region AA. The first main pattern SP1 is spaced apart from the high transmission region HA. The first main pattern SP1 has a predetermined shape and has a first area. In this embodiment, the first main pattern SP1 may have a diamond shape, for example. However, this is merely an example. In other embodiments, the first main pattern SP1 may have various shapes and is not limited to a specific embodiment, for example.

The first adjacent pattern SP1H is disposed adjacent to the high transmission region HA. A portion of the sensing unit SU, which overlaps the high transmission region HA, in this embodiment may be removed. The first adjacent pattern SP1H has a second area less than the first area of the first main pattern SP1. The first adjacent pattern SP1H may have a shape in which a region overlapping the high transmission region HA is removed from the same diamond shape as the first main pattern SP1.

In this embodiment, the first connection pattern CP1 extends in the second direction DR2. The first connection pattern CP1 is connected to the first main pattern SP1. The first connection pattern CP1 may be disposed between two first main patterns SP1 to connect the two first main patterns SP1 to each other. In an alternative embodiment, the first connection pattern CP1 is disposed between the first main pattern SP1 and the first adjacent pattern SP1H to connect the first main pattern SP1 to the first adjacent pattern SP1H.

The second sensing electrodes TE2 are arranged in the second direction DR2 and extend in the first direction DR1. Each of the second sensing electrodes TE2 may include a second main pattern SP2, a second adjacent pattern SP2H, and a second connection pattern CP2.

The second main pattern SP2 is disposed spaced apart from the high transmission region HA. The second main pattern SP2 may be spaced apart from the first main pattern SP1. In this embodiment, the separation between the first main pattern SP1 and the second main pattern SP2 may be a separation on a cross-section. The first main pattern SP1 and the second main pattern SP2 may be electrically insulated from each other to receive and transmit independent electrical signals.

In this embodiment, the second main pattern SP2 may have the same shape as that of the first main pattern SP1. In an embodiment, the second main pattern SP2 may have a diamond shape, for example. However, this is merely an example. In an embodiment, the second main pattern SP2 may have various shapes and is not limited to a specific embodiment, for example.

The second adjacent pattern SP2H is disposed adjacent to the high transmission region HA. The second adjacent pattern SP2H has an area less than that of the second main pattern SP2. The second adjacent pattern SP2H may have a shape in which a region overlapping the high transmission region HA is removed from the same diamond shape as the second main pattern SP2.

In this embodiment, the second connection pattern CP2 extends in the first direction DR1. The second connection pattern CP2 is connected to the second main pattern SP2. The second connection pattern CP2 may be disposed between two second main patterns SP2 to connect the two second main patterns SP2 to each other. In an alternative embodiment, the second connection pattern CP2 is disposed between the second main pattern SP2 and the second adjacent pattern SP2H to connect the second main pattern SP2 to the second adjacent pattern SP2H.

The sensing lines TL1, TL2, and TL3 are disposed in the peripheral region NAA. The sensing lines TL1, TL2, and TL3 may include first sensing lines TL1, second sensing lines TL2, and third sensing line TL3.

The first sensing lines TL1 are connected to the first sensing electrodes TE1, respectively. In this embodiment, the first sensing lines TL1 are connected to lower ends of both ends of the first sensing electrodes TE1, respectively.

Each of the second sensing lines TL2 is connected to one end of each of the second sensing electrodes TE2. In this embodiment, the second sensing lines TL2 are connected to left ends of both ends of the second sensing electrodes TE2, respectively.

The third sensing lines TL3 are connected to upper ends of both ends of the first sensing electrodes TE1, respectively. In an embodiment according to the invention, the first sensing electrodes TE1 may be respectively connected to the first sensing lines TL1 and the third sensing lines TL3. Thus, the sensitivity on the area with respect to the first sensing electrodes TE1, each of which has a length that is relatively longer than that of each of the second sensing electrodes TE2, may be uniformly maintained. However, this is merely an example. In an embodiment of the sensing unit SU of the invention, the third sensing lines TL3 may be omitted, but is not limited to a specific embodiment.

The sensing pads T1, T2, and T3 are disposed in the peripheral region NAA. The sensing pads T1, T2, and T3 may include first sensing pads T1, second sensing pads T2, and third sensing pads T3. The first sensing pads T1 are respectively connected to the first sensing lines TL1 to provide external signals to the first sensing electrodes TE1. The second sensing pads T2 are respectively connected to the second sensing lines TL2 so as to be electrically connected to the second sensing electrodes TE2, and the third sensing pads T3 are respectively connected to the third sensing lines TL3 so as to be electrically connected to the first sensing electrodes TE1.

In an embodiment according to the invention, the high transmission region HA may be provided in the region surrounded by the active region AA to prevent the bezel area BZA from increasing due to the electronic module EM (refer to FIGS. 1B and 2). In addition, since each of the pixels PX and the sensing electrodes TE1 and TE2, which are disposed adjacent to the high transmission region HA, is electrically connected via the high transmission region HA, the high transmission region HA may easily prevent display characteristics or sensitivity on the active region AA from being deteriorated.

Figure 4A:
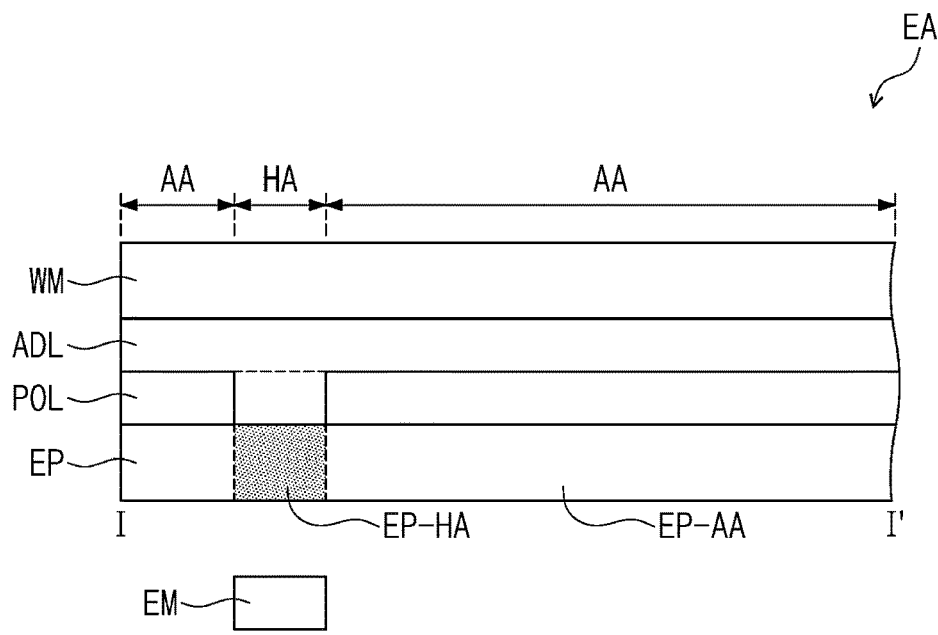
FIGS. 4A and 4B are cross-sectional views of an embodiment of the electronic apparatus according to the invention.
Figure 4B:
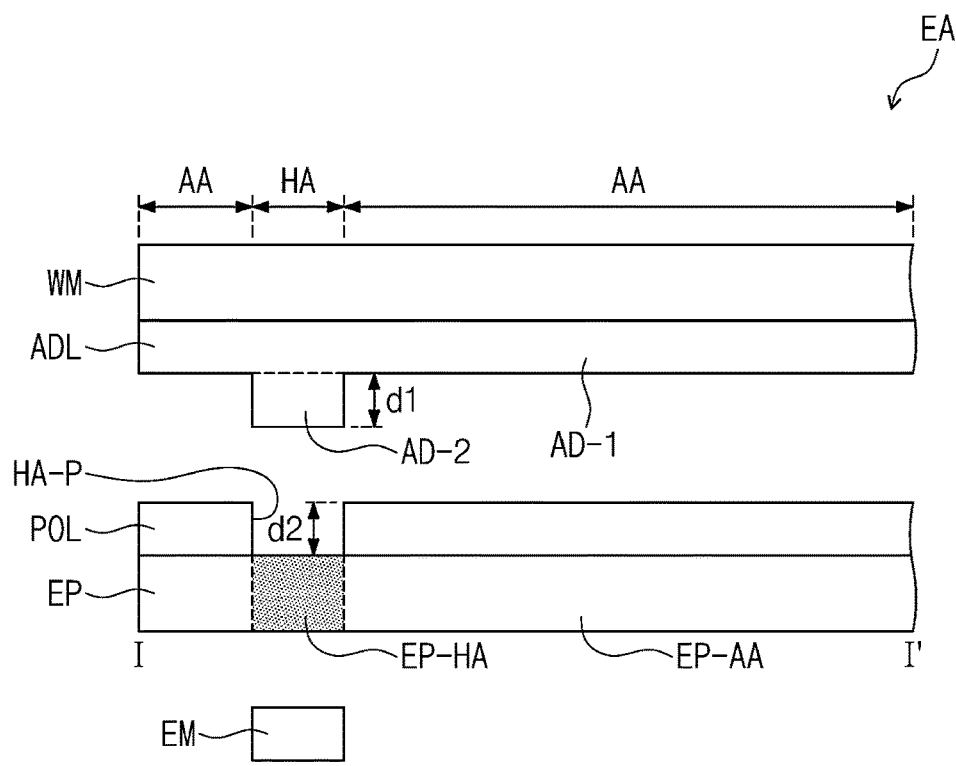

FIGS. 4A and 4B are cross-sectional views of an embodiment of the electronic apparatus according to the invention. FIG. 4A is a schematic cross-sectional view taken along line I-I' of FIG. 1B. FIG. 4B is a schematic cross-sectional view illustrating a portion of the configuration of the FIG. 4A.

FIGS. 4A and 4B illustrate arrangement relationship of the window WM, the electronic panel EP, the anti-reflection member POL, the adhesive layer ADL, and the electronic module EM among the constituents included in the electronic apparatus EA. For convenience of description, the constituents of the outer case HU and the circuit board DC are omitted. The same reference numeral may be given to constituents that are the same as those of FIGS. 1A to 3C, and their detailed descriptions are omitted.

Referring to FIGS. 4A and 4B, in the electronic apparatus EA in an embodiment, the adhesive layer ADL is disposed between the window WM and the anti-reflection member POL, and the electronic apparatus EA is attached by the adhesive layer ADL.

In the electronic apparatus EA in an embodiment, the adhesive layer ADL may include an epoxy resin. The adhesive layer ADL may include an OCR including an epoxy resin. In an embodiment, the adhesive layer ADL may include a bisphenol-F type epoxy resin, for example. The adhesive layer ADL may include an epoxy resin having low viscosity, high reactivity, and curable at a low temperature. In an embodiment, the adhesive layer ADL may include an epoxy resin represented by Chemical Formula 1 below.

zole, 2-(p-dimethyl-aminophenyl)-4,5-diphenylimidazole, 2-(2-hydroxyphenyl)-4,5-diphenylimidazole, di(4,5-diphenyl-2-imidazole)-phenyl-1,4,2-naphthyl-4,5-diphenylimidazole, and 2-p-methoxystyryl imidazole, and the like.

A hole HA-P of which at least a portion overlaps the high transmission region HA may be defined in the anti-reflection member POL. The hole HA-P may be a hole passing through the anti-reflection member POL. As the hole HA-P is defined in the anti-reflection member POL, a relatively high light transmittance may be provided in a region overlapping the high transmission region HA. When the anti-reflection member POL includes a polarizing film, the hole HA-P may be a hole defined through a punching process or the like in the polarizing film. When the anti-reflection member POL includes a color filter, the hole HA-P may be a stepped portion provided to overlap the high transmission region HA in a process of depositing the color filter.

The adhesive layer ADL may include a first adhesive pattern AD-1 and a second adhesive pattern AD-2. The first adhesive pattern AD-1 is disposed between the anti-reflection member POL and the window WM and may be a portion to which the anti-reflection member POL and the window WM are attached. The second adhesive pattern

[Chemical Formula 1]

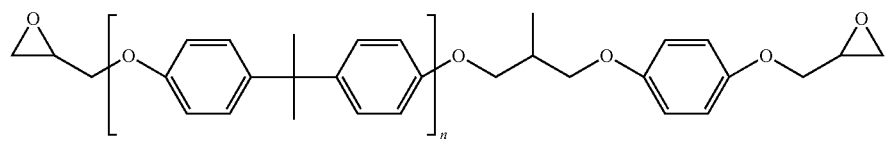

AD-2 may be a portion filling the hole HA-P defined in the anti-reflection member POL. The first adhesive pattern AD-1 and the second adhesive pattern AD-2 may be provided through an integral process and may have a unitary shape. That is, the first adhesive pattern AD-1 and the second adhesive pattern AD-2 may have a shape connected to each other and may not be provided as a separate constituent between the window WM and the anti-reflection member POL.

The second adhesive pattern AD-2 of the adhesive layer ADL may fill the hole HA-P of the anti-reflection member POL and may have the same shape as the shape of the hole HA-P. In the electronic apparatus EA in an embodiment, the hole HA-P is filled by the second adhesive pattern AD-2 so as not to generate a separate gap between the electronic panel EP, the anti-reflection member POL, and the window WM. A thickness d1 of the second adhesive pattern AD-2 and a depth d2 of the hole HA-P may be substantially the same.

The adhesive layer ADL may include a thermosetting resin and have a high transmittance in a near ultraviolet region. In an embodiment, the adhesive layer ADL may have a light transmittance equal to or greater than about 92 percent (%) in a wavelength range equal to or less than about 400 nanometers (nm). The adhesive layer ADL may have a light transmittance equal to or greater than about 92% in a wavelength range from about 380 nm to about 430 nm. The adhesive layer ADL may be a layer having high light transmittance in a visible region, an infrared region, and a near infrared region, as well as in the ultraviolet and near ultraviolet regions. In an embodiment, the adhesive layer ADL may have a light transmittance equal to or greater than about 92% in a wavelength range from about 380 nm to about 750 nm, for example.

The adhesive layer ADL may further include a thermosetting agent in addition to the epoxy resin. The thermosetting agent may be applied without limitation as long as it is a material for curing the epoxy resin. In an embodiment, the thermosetting agent may be a material for initiating a curing reaction by heat and improving adhesion, reactivity, etc., when forming the adhesive layer ADL, for example. In an embodiment, the thermosetting agent may include an amine-based thermosetting agent, or an imidazole-based thermosetting agent. The amine-based thermosetting agent may include aliphatic amine, modified aliphatic amine, aromatic amine, secondary amine, or a tertiary amine, for example, may include benzyldimethylamine, triethanolamine, triethylenetetramine, diethylenetriamine, triethyleneamine, dimethylaminoethanol, tri(dimethylaminomethyl) phenol, and the like. The imidazole-based thermosetting agent may include imidazole, isoimidazole, 2-methyl imidazole, 2-ethyl-4-methylimidazole, 2,4-dimethylimidazole, butylimidazole, 2-heptadecenyl-4-methylimidazole, 2-undecenylimidazole, 1-vinyl-2-methylimidazole, 2-undecylimidazole, 2-heptadecylimidazole (e.g., 2-n-heptadecylimidazole), 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole, addition products of imidazole and methylimidazole, addition products of imidazole and trimellitic acid, 2-n-heptadecyl-4-methylimidazole, phenylimidazole (e.g. 2-phenylimidazole), benzylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimida- The electronic panel EP may include a patterning part EP-HA overlapping the high transmission region HA. The patterning part EP-HA may be a portion at which a plurality of insulating layers and metal layers, which are included in the electronic panel EP, are patterned. The patterning part EP-HA may be a portion in which pixels PX of the electronic panel EP overlapping the high transmission region HA are patterned. As the plurality of insulating layers and the metal layers, which is included in the electronic panel EP, is patterned, the patterning part EP-HA may have a transmittance greater than that of a pixel part of the electronic panel EP overlapping the active region AA.

In the anti-reflection member POL of the electronic apparatus EA in an embodiment, the hole HA-P, of which at least a portion overlaps the high transmission region HA, is defined, and has a shape in which the adhesive layer ADL, through which the window WM and the anti-reflection member POL are attached, fills the hole HA-P of the anti-reflection member POL. More particularly, the first adhesive pattern AD-1, through which the anti-reflection member POL and the window WM are attached, and the second adhesive pattern AD-2, which fills the hole HA-P of the anti-reflection member POL, are provided in a unitary shape. Thus, when filling the hole HA-P of the anti-reflection member POL through a separate resin pattern, defects due to overflow of the resin pattern or bubbles due to shrinkage of the resin pattern may be prevented to improve reliability of the electronic panel EP. In addition, as the adhesive layer ADL, through which the anti-reflection member POL and the window WM are attached, is provided using the thermosetting resin having the high light transmittance in the near ultraviolet and visible light ranges, the high transmission region HA in a low wavelength range may be improved in transmittance to improve functions of the electronic module EM such as the camera and the sensor.

Figure 5A:
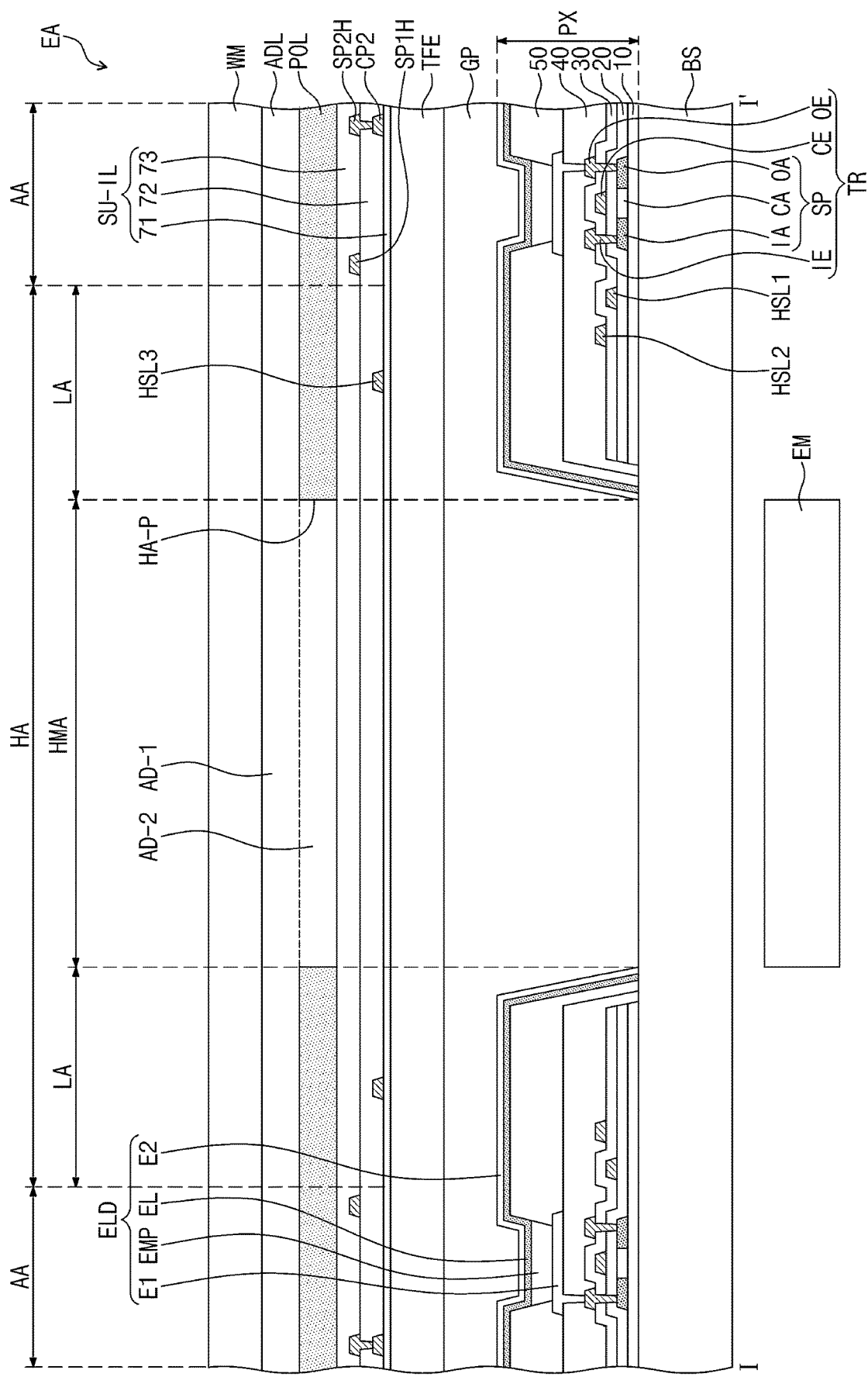
Figure 5C:
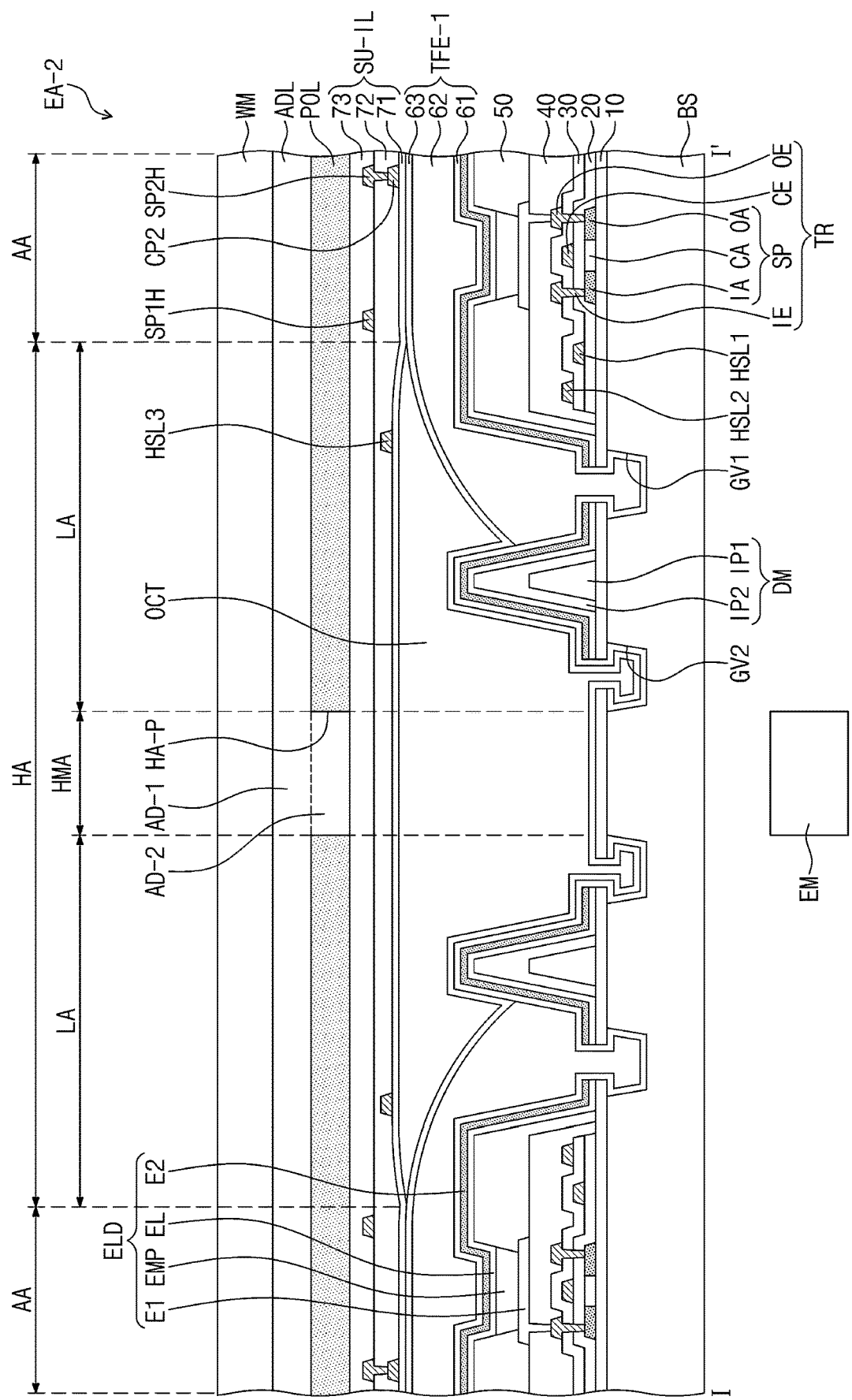

FIGS. 5A to 5C are cross-sectional views of an embodiment of the electronic apparatus according to the invention. FIGS. 5A to 5C illustrate cross-sectional views of the electronic apparatus of FIGS. 4A and 4B in more detail. Hereinafter, in describing the electronic apparatus in an embodiment of the invention with reference to FIGS. 5A to 5C, the same reference numerals will be assigned to the same constituents as those described above, and duplicated descriptions will be omitted.

In FIG. 5A, for easy description, a base substrate BS, a thin film transistor TR, a light emitting element ELD, and a plurality of insulating layers 10, 20, 30, 40, 50, and SU-IL, an encapsulation layer TFE, a plurality of sensing patterns SP1H and SP2H, a second connection pattern CP2, and hole signal lines HSL1, HSL2, and HSL3 among the constituents of the electronic panel EP (refer to FIGS. 1B, 2, 4A and 4B) are exemplarily illustrated.

The insulating layers 10, 20, 30, 40, 50, and SU-IL may include first to fifth insulating layers 10, 20, 30, 40, and 50, and the sensing insulating layer SU-IL, which are sequentially laminated. In the plurality of insulating layers 10, 20, 30, 40, 50, and SU-IL, each of the first to fifth insulating layers 10, 20, 30, 40, and 50 and the sensing insulating layer SU-IL, which are sequentially laminated, may include an organic material and/or an inorganic material and may have a single layer or laminated structure.

In this embodiment, the base substrate BS may be optically transparent. In an embodiment, the base substrate BS may have visible light and near ultraviolet transmittance equal to or greater than about 90%, for example.

The first insulating layer 10 is disposed on the base substrate BS to cover an entire surface of the base substrate BS. The first insulating layer 10 may include a barrier layer and/or a buffer layer. Thus, the first insulating layer 10 may prevent oxygen or moisture introduced through the base substrate BB from being penetrated into the pixel PX or may provide a top surface having low surface energy to the pixel PX so that the pixel PX is stably provided on the base substrate BS.

In this embodiment, the first insulating layer 10 may be optically transparent. In an embodiment, the first insulating layer 10 may have a visible light and near ultraviolet transmittance equal to or greater than about 90%, for example.

The thin film transistor TR and the light emitting element ELD constitute the pixel PX. The thin film transistor TR may correspond to the sixth transistor TR6 (refer to FIG. 3B) of the pixel PX.

The thin film transistor TR may include a semiconductor pattern SP, a control electrode CE, an input electrode IE, and an output electrode OE. The semiconductor pattern SP is disposed on the first insulating layer 10.

The semiconductor pattern SP includes a semiconductor material. In an embodiment, the semiconductor pattern SP may include the group III elements, the group V elements, a combination of the group III elements or group V elements, or an oxide semiconductor, for example.

The semiconductor pattern SP may be divided into a channel region CA and an input region IA and output region OA, which are spaced apart from each other with the channel region CA therebetween. The channel region CA, the input region IA, and the output region OA have a unitary shape to be connected to each other.

The channel region CA may be a region overlapping the control electrode CE in the plan view. The input region IA and the output region OA may have relatively high charge mobility compared to that of the channel region CA. The charges within the semiconductor pattern SP may move from the input region IA to the output region OA through the channel region CA.

The control electrode CE is disposed on the second insulating layer 20. The second insulating layer 20 is disposed on the first insulating layer 10 to cover the semiconductor pattern SP. The control electrode CE may be spaced apart from the semiconductor pattern SP with the second insulating layer 20 therebetween in a cross section.

The input electrode IE and the output electrode OE are disposed on the third insulating layer 30. The third insulating layer 30 is disposed on the second insulating layer 20 to cover the control electrode CE.

The input electrode IE passes through the second insulating layer 20 and the third insulating layer 30 and is connected to the input region IA. The output electrode OE is spaced apart from the input electrode IE and connected to the output region OA. Each of the input electrode IE and the output electrode OE may include a conductive material. The input electrode IE provides charges to the input region IA, and the output electrode OE transfers the electric charges moving to the output region OA to the light emitting element ELD.

In the thin film transistor TR in this embodiment, the input electrode IE and the output electrode OE may be omitted. That is, the thin film transistor TR may be constituted by only the control electrode CE and the semiconductor pattern SP. Here, the input region IA and the output region OA may function as the input electrode IE and the output electrode OE, and the input electrode IE and the output electrode OE may function as connection electrodes that connect the thin film transistor TR to other signal lines or other elements. The thin film transistor TR in an embodiment of the invention may be provided in various structures and is not limited to a specific embodiment.

The light emitting element ELD may include a first electrode E1, a second electrode E2, and a light emission pattern EMP. The first electrode E1 is disposed on the fourth insulating layer 40. The fourth insulating layer 40 is disposed on the third insulating layer 30 to cover the thin film transistor TR. The first electrode E1 is connected to the output electrode OE and is electrically connected to the thin film transistor TR.

The second electrode E2 is disposed on the fifth insulating layer 50 disposed on the fourth insulating layer 40. The fifth insulating layer 50 may include an organic material and/or an inorganic material and have a single layer or multilayered structure.

The second electrode E2 may have an area covering at least the entire surface of the active region AA. Thus, the plurality of light emitting elements ELD may include one second electrode E2 in common. However, this is merely an example. In an embodiment, the second electrode E2 may be provided for each pixel PX to correspond to the first electrode E1, for example, and is not limited to a specific embodiment.

An opening exposing at least a portion of the first electrode E1 may be defined in the fifth insulating layer 50. The light emission pattern EMP may be disposed in the opening. The light emission pattern EMP may include a light emitting material including a fluorescent material or a phosphorescent material. The light emitting material may include an organic light emitting material or an inorganic light emitting material and is not limited to either. Unlike the configuration illustrated in FIGS. 5A to 5C, the light emission pattern EMP may be disposed as a common layer on the entire surface of the active region AA.

Referring to FIGS. 5A to 5C, the light emitting element ELD may further include a control layer EL disposed between the first electrode E1 and the second electrode E2. The control layer EL may have an area covering the entire surface of at least the active region AA. The control layer EL may include an organic material. The control layer EL controls movement of the charges to improve luminous efficiency and lifetime of the light emitting element ELD. The control layer EL may include an electron transport material, an electron injection material, a hole transport material, or a hole injection material.

In this embodiment illustrated in FIGS. 5A to 5C, the control layer EL is illustrated as being disposed on the light emission pattern EMP, but this is merely an example. In an embodiment, the control layer EL in an embodiment of the invention may be disposed between the light emission pattern EMP and the first electrode E1 or may be provided in plural that are respectively disposed between the light emission pattern EMP and the first electrode E1 and between the light emission pattern EMP and the second electrode E2, for example, and is not limited to a specific embodiment.

The encapsulation layer TFE may be disposed on the light emitting element ELD to cover the light emitting element ELD. The encapsulation layer TFE may be spaced apart from the light emitting element ELD with a predetermined space GP therebetween to encapsulate the light emitting element ELD. The space GP may be filled with air, an inert gas, or an adhesive material. The encapsulation layer MB may be a glass substrate provided in the form of an encapsulation substrate. Thus, the electronic apparatus EA including the encapsulation layer TFE may be a rigid electronic apparatus EA.

In this embodiment, the sensing unit SU (refer to FIG. 3C) is illustratively illustrated as an embodiment as being disposed on the display unit DU (refer to FIG. 3A). As described above, the first adjacent pattern SP1H, the second adjacent pattern SP2H, and the second connection pattern CP2 may be some constituents of the sensing unit SU. The first adjacent pattern SP1H, the second adjacent pattern SP2H, and the second connection pattern CP2 constitute the sensing unit SU together with the sensing insulating layer SU-IL. The sensing electrodes included in the sensing unit SU in this embodiment are illustratively illustrated as an embodiment including a plurality of mesh lines. That is, in this embodiment, each of the first adjacent pattern SP1H and the second adjacent pattern SP2H includes a plurality of mesh lines, and portions of the mesh lines are respectively illustrated in FIGS. 5A to 5C. However, this is merely an example, and each of the first adjacent pattern SP1H and the second adjacent pattern SP2H may include transparent conductive oxide. Here, the first adjacent pattern SP1H or the second adjacent pattern SP2H may have a size overlapping the light emission pattern EMP in the plan view.

The sensing insulating layer SU-IL may include first to third sensing insulating layers 71, 72, and 73, which are sequentially laminated on the encapsulation layer TFE. The sensing insulating layer SU-IL may overlap each of the active region AA and the high transmission region HA.

Each of the first to third sensing insulating layers 71, 72, and 73 may be optically transparent. In an embodiment, each of the first to third sensing insulating layers 71, 72, and 73 may have a visible light and near ultraviolet transmittance equal to or greater than about 90%, for example. Each of the first to third sensing insulating layers 71, 72, and 73 may have an inorganic layer, an organic layer, or a laminated structure thereof.

In this embodiment, the first adjacent pattern SP1H and the second adjacent pattern SP2H are disposed in the same layer, and the second connection pattern CP2 is disposed in a layer different from the second adjacent pattern SP2H. The second connection pattern CP2 may be disposed between the first sensing insulating layer 71 and the second sensing insulating layer 72, and the second adjacent pattern SP2H may pass through the second sensing insulating layer 72 and be connected to the second connection pattern CP2. The second connection pattern CP2 connects the second main pattern SP2 (refer to FIG. 3C, not shown) to the second adjacent pattern SP2H. Although not shown, the first connection pattern CP1 may be disposed in the same layer as the first main pattern SP1 and be directly connected to the first main pattern SP1.

However, this is merely an example. In an embodiment, the second connection pattern CP2 may be disposed in the same layer as the second adjacent pattern SP2H, and the first connection pattern CP1 may be disposed on a layer different from the first adjacent pattern SP1H, for example. In an alternative embodiment, the first sensing electrode TE1 (refer to FIG. 3A) and the second sensing electrode TE2 (refer to FIG. 3A) may be disposed in layers different from each other. The sensing unit SU in an embodiment of the invention may be provided in various structures and is not limited to a specific embodiment.

The hole signal lines HSL1, HSL2, and HSL3 are disposed in the high transmission region HA. The high transmission region HA may include a central region HMA and a line region LA.

The central region HMA may be a region of the electronic module EM, which substantially overlaps a receiver (e.g., "TM2" in FIG. 2) that receives an external input (e.g., "TC"

in FIG. 1A) or the output unit that provides an output. In an embodiment, when the electronic module EM is a camera module, the central region HMA may be a region of the high transmission region HA, which overlaps a lens, for example. The central region HMA may be a region having the highest light transmittance on the high transmission region HA. In FIG. 5A, the electronic module EM is briefly illustrated in a rectangular shape for easy description. In this embodiment, the central region HMA may have a circular shape in the plan view.

The hole signal lines HSL1, HSL2, and HSL3 are disposed in the line region LA. In FIG. 5A, for ease of description, a first hole signal line HSL1, a second hole signal line HSL2, and a third hole signal line HSL3 corresponding to some of the hole signal lines HSL1, HSL2, and HSL3 are illustrated.

The first hole signal line HSL1 and the second hole signal line HSL2 constitute a portion of the display unit DU (refer to FIG. 3A). The first hole signal line HSL1 is illustrated as being disposed between the second insulating layer 20 and the third insulating layer 30. The first hole signal line HSL1 may be a scan line (e.g., "GL" in FIG. 3A) connected to the pixels PX disposed adjacent to the high transmission region HA. The first hole signal line HSL1 may provide the same scan signal to the pixels PX, which are spaced apart from each other with the high transmission region HA therebetween, via the line region LA.

The second hole signal line HSL2 is illustrated as being disposed between the third insulating layer 30 and the fourth insulating layer 40. The second hole signal line HSL2 may be a data line (e.g. "DL" in FIG. 3A) connected to the pixels PX, which are disposed adjacent to the high transmission region HA. The second hole signal line HSL2 electrically connects the pixels PX, which are spaced apart from each other with the high transmission region HA therebetween, via the line region LA.

The third hole signal line HSL3 is disposed on the encapsulation layer TFE to constitute a portion of the sensing unit SU (referring to FIG. 3A). In this embodiment, the third hole signal line HSL3 is illustrated as being disposed between the first sensing insulating layer 71 and the second sensing insulating layer 72, but this is merely an example. In an embodiment, the third hole signal line HSL3 may be disposed between the second sensing insulating layer 72 and the third sensing insulating layer 73, for example.

The third hole signal line HSL3 may be a connection line connected to the sensing patterns SP1H and SP2H disposed adjacent to the high transmission region HA. In an embodiment, the third hole signal line HSL3 may connect two first adjacent patterns SP1H spaced apart from each other with the high transmission region HA therebetween via the line region LA or may connect two second adjacent patterns SP2H, for example. Accordingly, even when the sensing electrodes TE1 and TE2 pass through the high transmission region HA, a limitation such as a decrease in sensitivity may be prevented.

Holes HA-P passing through the anti-reflection member POL may be defined in the anti-reflection member POL, and the holes HA-P may overlap the central region HMA. In FIG. 5A, the hole HA-P is defined in the central region HMA, and the rest of the anti-reflection member POL except for the hole HA-P overlaps the active region AA and the line region LA, but are not limited thereto. In an embodiment, the hole HA-P of the anti-reflection member POL may overlap at least a portion of the line region LA, for example.

Referring to FIG. 5A, the anti-reflection member POL and the window WM may be attached by the adhesive layer ADL disposed on the anti-reflection member POL. The adhesive layer ADL may include a first adhesive pattern AD-1 disposed between the anti-reflection member POL and the window WM so that the anti-reflection member POL and the window WM are attached and a second adhesive pattern AD-2 filling the hole HA-P defined in the anti-reflection member POL.

In an embodiment of the electronic panel EP according to the invention, the central region HMA overlapping the electronic module EM may be constituted of only the insulating layers having high light transmittance. Among the insulating layers constituting the electronic panel EP, the base substrate BS, the encapsulation layer TFE (encapsulation substrate), and the first to third sensing insulating layers 71, 72, and 73, which have the high light transmittance, may be disposed in the central region HMA, and the control layer EL or the plurality of first to fifth insulating layers 10, 20, 30, 40, and 50, which have the low light transmittance, may be removed from the central region HMA. Thus, the central region HMA having the high light transmittance may be provided so that the electronic module EM stably operates even though a physical hole passing through the central region HMA is not provided.

FIG. 5B illustrates an embodiment in which an additional hole HA-SU overlapping the central region HMA is defined in a sensing insulating layer SU-IL1 included in the sensing unit SU (refer to FIG. 3C) when compared to FIG. 5A. The additional hole HA-SU defined in the sensing insulating layer SU-IL1 may be defined through the same process as the hole HA-P of the anti-reflection member POL, and thus, the additional hole HA-SU and the hole HA-P may be extended to each other. The additional hole HA-SU defined in the sensing insulating layer SU-IL1 and the hole HA-P of the anti-reflection member POL may have the same shape in the plan view.

In an embodiment of an electronic apparatus EA-1, the additional hole HA-SU defined in the sensing insulating layer SU-IL1 in addition to the hole HA-P of the anti-reflection member POL may also be filled with a second adhesive pattern AD-21 of an adhesive layer ADL. As the additional hole HA-SU is defined in the sensing insulating layer SU-ILL the second adhesive pattern AD-21 may contact a top surface of the encapsulation layer TFE. In the electronic apparatus EA-1 in an embodiment, only the base substrate BS, the encapsulation layer TFE (encapsulation substrate), and the adhesive layer ADL, which have the high light transmittance, may be provided in the central region HMA overlapping the electronic module EM so that the electronic module EM stably operates.

FIG. 5C illustrates an embodiment in which an encapsulation layer TFE-1 is provided as not an encapsulation substrate but a thin film encapsulation layer including a plurality of insulating layers. In an embodiment of an electronic apparatus EA-2, the encapsulation layer TFE-1 may include a first inorganic layer 61, an organic layer 62, and a second inorganic layer 63, which are sequentially laminated in the third direction DR3. However, the invention is not limited thereto. In an embodiment, the encapsulation layer TFE-1 may further include a plurality of inorganic layers and organic layers, for example.

The first inorganic layer 61 may cover the second electrode E2. The first inorganic layer 61 may prevent external moisture or oxygen from being permeated into the light emitting element ELD. In an embodiment, the first inorganic layer 61 may include silicon nitride, silicon oxide, or a combination thereof, for example. The first inorganic layer 61 may be provided through a chemical vapor deposition process.

The first inorganic layer 61 may have a light transmittance less than that of the base substrate BS. In an embodiment, the first inorganic layer 61 may include silicon nitride ($SiN_x$), for example.

The organic layer 62 may be disposed on the first inorganic layer 61 to contact the first inorganic layer 61. The organic layer 62 may provide a flat surface on the first inorganic layer 61. A curve disposed on a top surface of the first inorganic layer 61 or particles existing on the first inorganic layer 61 may be covered by the organic layer 62 to prevent the surface state of a top surface of the first inorganic layer 61 from having an influence on the constituents disposed on the organic layer 62. Also, the organic layer 62 may reduce stress between the layers contacting each other. The organic layer 62 may include an organic material and be provided through a solution process such as spin coating, slit coating, inkjet process, and the like.

The second inorganic layer 63 may be disposed on the organic layer 62 to cover the organic layer 62. The second inorganic layer 63 may be relatively stably disposed on the flat surface when compared to the second inorganic layer 63 disposed on the first inorganic layer 61. The second inorganic layer 63 may encapsulate moisture discharged from the organic layer 62 to prevent the moisture from being introduced.

The second inorganic layer 63 may be optically transparent. In an embodiment, the second inorganic layer 63 may have a visible light and near ultraviolet transmittance equal to or greater than about 90%, for example. The second inorganic layer 63 may have a relatively high light transmittance compared to that of the first inorganic layer 61. The second inorganic layer 63 may include silicon oxide ($SiO_x$) or silicon oxynitride (SiON).

The second inorganic layer 63 may be provided through a chemical vapor deposition process. Each of the first inorganic layer 61, the organic layer 62, and the second inorganic layer 63 may include a plurality of layers and is not limited to a specific embodiment.

The electronic panel EP may further include a dam part DM and a planarization pattern OCT, and at least one grooves GV1 and GV2 may be defined in the electronic panel EP. The grooves GV1 and GV2, the dam part DM, and the planarization pattern OCT may be disposed in the high transmission region HA.

The grooves GV1 and GV2 may be defined in the line region LA of the high transmission region HA. Each of the grooves GV1 and GV2 may be defined by recessing at least a portion of the base substrate BS. Each of the grooves GV1 and GV2 has a depth so as not to pass through the base substrate BS. The grooves GV1 and GV2 may include a first groove GV1 and a second groove GV2, which are spaced apart from each other.

The first groove GV1 may be relatively adjacent to the active region AA and be filled by the organic layer 62. The second groove GV2 may be relatively adjacent to the central region HMA and be sequentially covered by the first inorganic layer 61 and the second inorganic layer 63, which are spaced apart from the organic layer 62. Each of the first groove GV1 and the second groove GV2 has a closed line shape surrounding the central region HMA or an intermittent line shape surrounding at least a portion of an edge of the central region HMA, but is not limited to a specific embodiment.

An end of the first insulating layer 10 may have an undercut shape by protruding from each of the first groove GV1 and the second groove GV2. The control layer EL and the second electrode E2 are cut off by the first groove GV1 and the second groove GV2, respectively. In an embodiment according to the invention, the grooves GV1 and GV2 may be defined in the electronic panel EP to prevent continuity of the control layer EL or the second electrode E2, which provides a penetration path of external moisture or oxygen, from occurring, thereby preventing the elements disposed in the active region AA from being damaged.

Although not shown, some patterns that are separated from the control layer EL or the second electrode E2 may be disposed inside each of the first groove GV1 and the second groove GV2 and be covered by at least one of the first inorganic layer 61 and the second inorganic layer 63. Thus, in the manufacturing process of the electronic panel EP, an influence of some patterns due to the movement to other elements may be prevented. Thus, process reliability of the electronic panel EP may be improved. However, this is merely an example. In another embodiment of the electronic panel EP of the invention, the grooves GV1 and GV2 may be defined singly or omitted, for example, and is not limited to a specific embodiment.

The dam part DM is disposed in the line region LA to partition the formation region of the organic layer 62 into predetermined regions and prevent the organic layer 62 from being additionally expanded. The dam part DM may be disposed between the first and second grooves GV1 and GV2. The dam part DM is illustrated in a laminated structure including a plurality of insulating patterns IP1 and IP2. However, this is merely an example. In an embodiment, the dam part DM may have a single layer structure, and is not limited to a specific embodiment, for example.

The planarization pattern OCT includes an organic material. The planarization pattern OCT may be disposed on the entire surface of the high transmission region HA. The planarization pattern OCT covers a non-planarization surface provided on the high transmission region HA by the dam part DM or the grooves GV1 and GV2 to provide a flat surface thereon. Thus, the flat surface may be stably provided even on an area on which the organic layer 62 is not disposed in the high transmission region HA.

The planarization pattern OCT may be optically transparent. In an embodiment, the planarization pattern OCT may have a visible light and near ultraviolet transmittance equal to or greater than about 90%, for example.

The first inorganic layer 61 in an embodiment of the invention may be removed from the central region HMA. The first inorganic layer 61 may have a relatively low transmittance compared to that of the second inorganic layer 63. In an embodiment according to the invention, the transmittance of the central region HMA may be improved by providing the first inorganic layer 61 in a shape that does not overlap the central region HMA.

Figure 6:
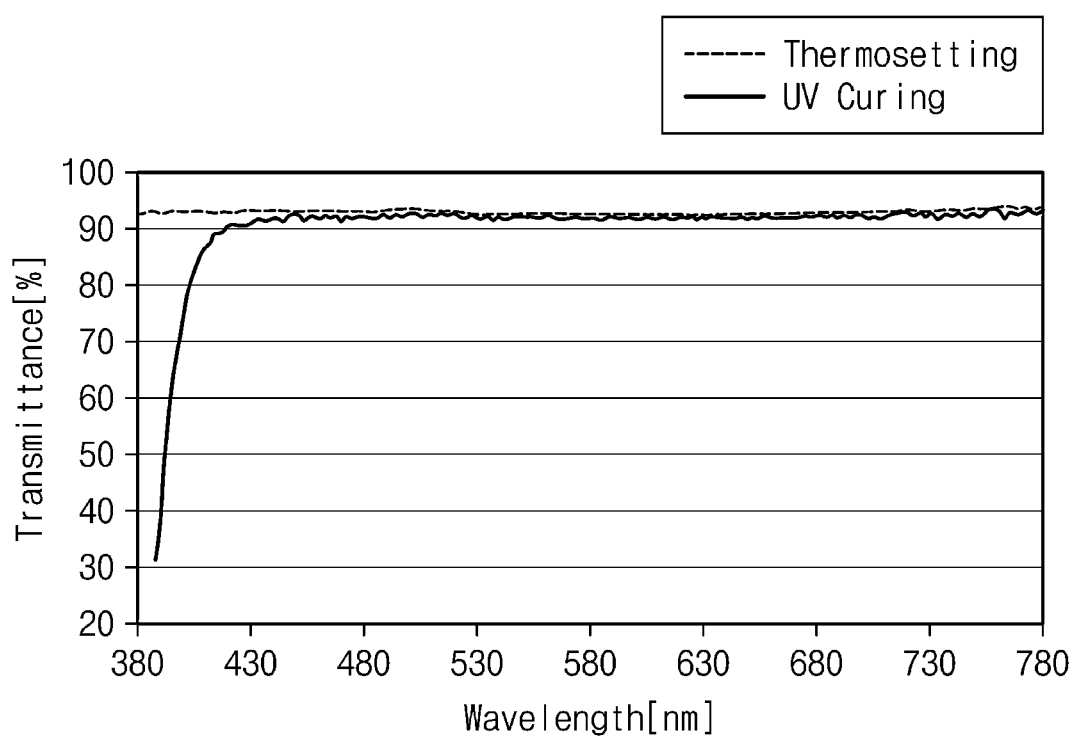
FIG. 6 is a graph illustrating light transmittance for each wavelength of an embodiment of an adhesive layer according to the invention and an adhesive layer of a related art.

FIG. 6 is a graph illustrating light transmittance for each wavelength of an embodiment of an adhesive layer according to the invention and an adhesive layer of the related art. FIG. 6 illustrates a graph of a light transmittance within a range from about 380 nm to about 780 nm of the adhesive layer including an embodiment of the thermosetting resin according to the invention and the adhesive layer made of the UV curable resin of the related art.

Referring to the results of FIG. 6, the thermosetting resin adhesive layer applied to an embodiment of the invention has a high light transmittance equal to or greater than about 92% in the near ultraviolet and the visible light region.

Particularly, it is seen that an embodiment of the thermosetting resin adhesive layer according to the invention has a high light transmittance equal to or greater than about 92% in the wavelength range from about 380 nm to about 430 nm, which is a range of ultraviolet and near ultraviolet rays. Unlike the embodiment of the invention, in the case of the adhesive layer made of the ultraviolet curing resin of the related art, the adhesive layer may have a reduced light transmittance in a wavelength range from about 380 nm to about 430 nm that is the ultraviolet and near ultraviolet range, more particularly, a light transmittance of about 70% or less in a wavelength range equal to or less than about 400 nm because of absorbing the ultraviolet rays and having a curable property. In the electronic apparatus in an embodiment of the invention, the thermosetting resin adhesive layer through which the window and the anti-reflection member are attached and which fills the hole defined in the anti-reflection member may have the high light transmittance in the wavelength range from about 380 nm to about 430 nm in the ultraviolet and near ultraviolet range to improve the transmittance in a low wavelength range, i.e., blue light and to allow the electronic module overlapping the hole to stably operate.

Figure 7A:
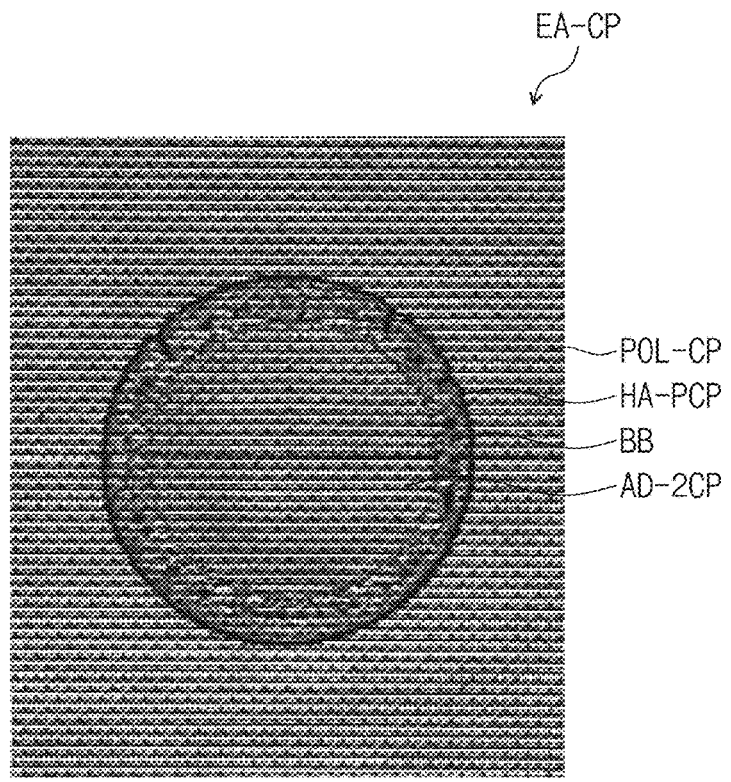
FIG. 7A is an enlarged view illustrating one cross-section of the electronic apparatus to which the related art of an adhesive layer is applied.
Figure 7B:
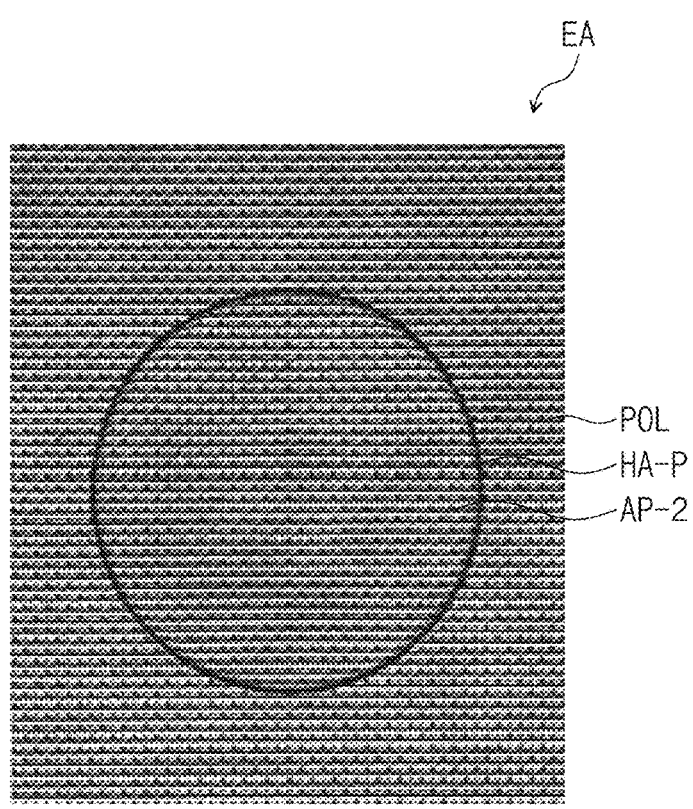
FIG. 7B is an enlarged view illustrating one cross-section of the electronic apparatus to which an embodiment of an adhesive layer is applied.

FIG. 7A is an enlarged view illustrating one cross-section of the electronic apparatus to which the related art of the adhesive layer is applied. FIG. 7B is an enlarged view illustrating one cross-section of the electronic apparatus to which the adhesive layer in an embodiment of the invention is applied. FIG. 7A illustrates an enlarged cross-sectional view according to a comparison example in which a separate adhesive resin pattern AD-2CP fills a hole HA-PCP defined in an anti-reflection member POL-CP, and the anti-reflection member POL-CP and a window (not shown) are attached through an optically clear adhesive ("OCA"). FIG. 7B illustrates an enlarged cross-sectional view in an embodiment in which a second adhesive pattern AD-2 filling a hole HA-P of an anti-reflection member POL and a first adhesive pattern through which the anti-reflection member POL and a window are attached are unitarily provided.

As illustrated in FIG. 7A, in an electronic apparatus EA-CP, when the adhesive resin pattern AD-2CP filling the hole HA-PCP defined in the anti-reflection member POL-CP and the optically transparent adhesive film are separately provided, the resin may overflow when the adhesive resin pattern AD-2CP is filled, and bubbles BB may be generated when the adhesive resin pattern AD-2CP is cured. Thus, a light transmittance of the hole HA-PCP in which the adhesive resin pattern AD-2CP is disposed may be reduced. However, as illustrated in FIG. 7B, when the second adhesive pattern AD-2 filling the hole HA-P of the anti-reflection member POL and the first adhesive pattern through which the anti-reflection member POL and the window are attached are unitarily provided, the overflowing of the resin and the generation of the bubbles may be prevented, and thus, the light transmittance of the hole HA-P may be prevented from being reduced.

FIGS. 8A to 8E are cross-sectional views sequentially illustrating an embodiment of a method for manufacturing an electronic apparatus according to the invention. FIGS. 8A to 8E briefly illustrate a method of manufacturing an electronic apparatus in a cross-section corresponding to the cross-section illustrated in FIG. 4A. Hereinafter, in describing an embodiment of the method for manufacturing the electronic apparatus according to the invention with reference to FIGS. 8A to 8C, the same reference numerals will be assigned to the same constituents as those described above, and duplicated descriptions will be omitted.

A method for manufacturing an electronic apparatus in an embodiment of the invention includes a process of preparing an electronic panel, in which a high transmission region and an active region surrounding at least a portion of the high transmission region are defined, a process of forming an anti-reflection member in which a hole of which at least a portion overlaps the high transmission region is defined, a process of applying an adhesive resin on the anti-reflection member so that the hole is filled, and a process of attaching a window to the anti-reflection member through the adhesive resin.

Figure 8A:
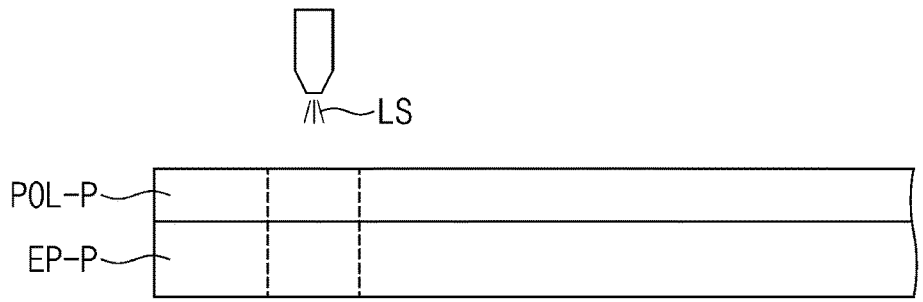
FIGS. 8A to 8E are cross-sectional views sequentially illustrating an embodiment of a method for manufacturing an electronic apparatus according to the invention.
Figure 8B:
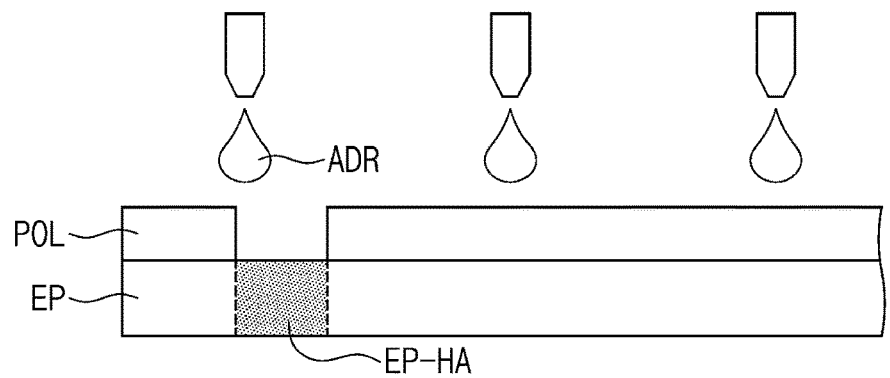

Referring to FIGS. 8A and 8B, in the method for manufacturing the electronic apparatus in an embodiment, a preliminary anti-reflection member POL-P may be disposed on a preliminary electronic panel EP-P to form an anti-reflection member POL in which a hole HA-P (refer to FIGS. 4B and 5A to 5C) is defined through a patterning process. The hole HA-P of the anti-reflection member POL may be provided by an etching process through a laser LS. In the process of forming the hole HA-P through the laser LS, a plurality of insulating layers in a region of the preliminary electronic panel EP-P, which overlaps the hole HA-P, may be etched together to form an electronic panel EP. That is, the hole HA-P of the anti-reflection member POL and a patterning part EP-HA of the electronic panel EP may be defined through the same etching process using the laser LS.

Figure 8C:
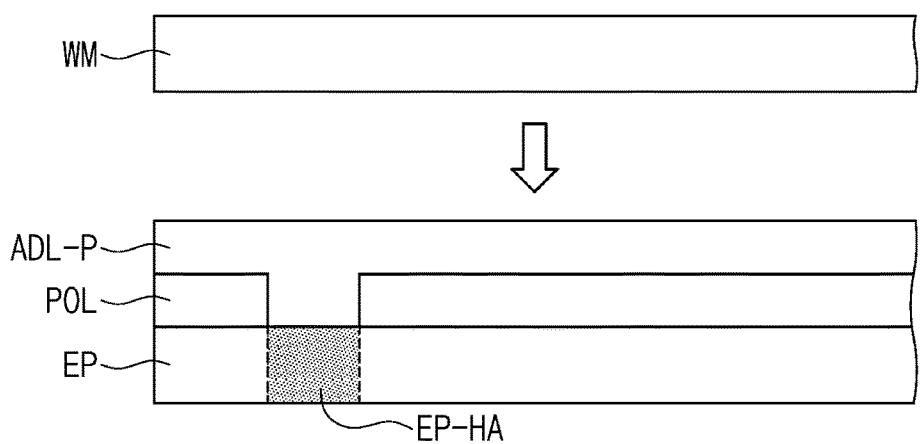

Referring to FIGS. 8B and 8C, in the method for manufacturing the electronic apparatus in an embodiment, an adhesive resin ADR may be applied to the anti-reflection member POL, in which the hole HA-P is defined, to form a preliminary adhesive layer ADL-P. The adhesive resin ADR may be applied to fill the holes HA-P. The adhesive resin ADR may include a thermosetting resin. The adhesive resin ADR may include an epoxy resin. In an embodiment, the adhesive resin ADR may include a bisphenol-F type epoxy resin, for example. The adhesive resin ADR may include an epoxy resin having low viscosity, high reactivity, and curable at a low temperature. In an embodiment, the adhesive resin ADR may include an epoxy resin represented by Chemical Formula 1 below.

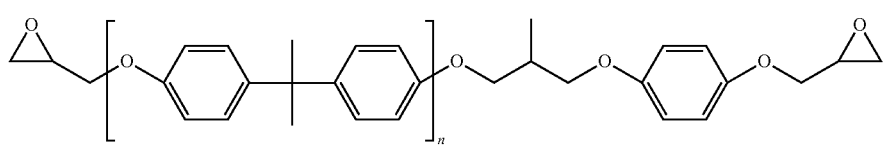

[Chemical Formula 1]

The adhesive resin ADR may further include a thermosetting agent in addition to the epoxy resin. The thermosetting agent may be applied without limitation as long as it is a material for curing the epoxy resin. In an embodiment, the thermosetting agent may be a material for initiating a curing reaction by heat and improving adhesion, reactivity, and the like. In an embodiment, the thermosetting agent may include an amine-based thermosetting agent, or an imidazole-based thermosetting agent. The amine-based thermosetting agent may include aliphatic amine, modified aliphatic amine, aromatic amine, secondary amine, or a tertiary amine, for example, may include benzyldimethylamine, triethanolamine, triethylenetetramine, diethylenetriamine, triethyleneamine, dimethylaminoethanol, tri(dimethylaminomethyl) phenol, and the like. The imidazole-based thermosetting agent may include imidazole, isoimidazole, 2-methyl imidazole, 2-ethyl-4-methylimidazole, 2,4-dimethylimidazole, butylimidazole, 2-heptadecenyl-4-methylimidazole, 2-undecenylimidazole, 1-vinyl-2-methylimidazole, 2-undecylimidazole, 2-heptadecylimidazole (e.g., 2-n-heptadecylimidazole), 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole, addition products of imidazole and methylimidazole, addition products of imidazole and trimellitic acid, 2-n-heptadecyl-4-methylimidazole, phenylimidazole (e.g., 2-phenylimidazole), benzylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethyl-aminophenyl)-4,5-diphenylimidazole, 2-(2-hydroxyphenyl)-4,5-diphenylimidazole, di(4,5-diphenyl-2-imidazole)-phenyl-1,4,2-naphthyl-4,5-diphenylimidazole, and 2-p-methoxystyryl imidazole, and the like.

The adhesive resin ADR may be applied through an inkjet method. As the adhesive resin ADR is applied through the inkjet method, the preliminary adhesive layer ADL-P may be provided so that the hole HA-P defined in the anti-reflection member POL is filled without generating an air gap or the like.

Figure 8D:
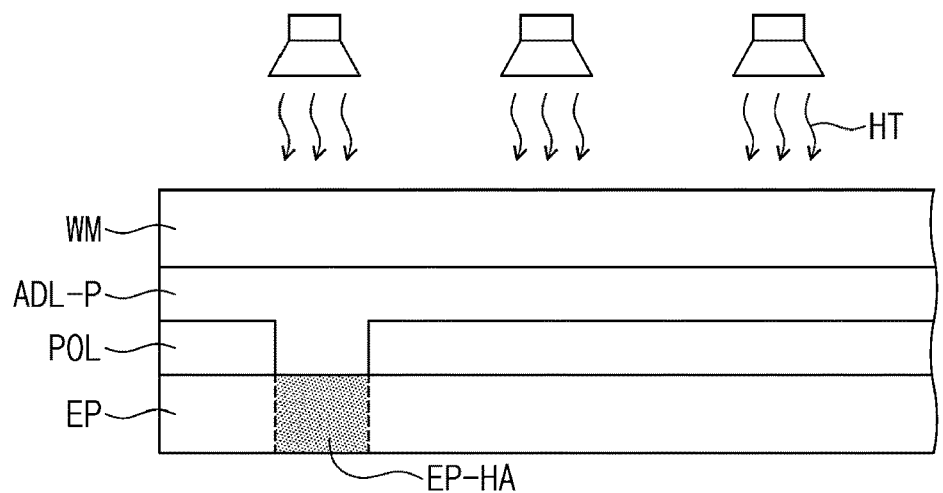

Referring to FIGS. 8C and 8D, in the method for manufacturing the electronic apparatus in an embodiment, after the preliminary adhesive layer ADL-P is provided, a window WM may be disposed on the anti-reflection member POL with the preliminary adhesive layer ADL-P therebetween. The window WM may include an optically transparent insulating material, for example, glass or plastic.

Figure 8E:
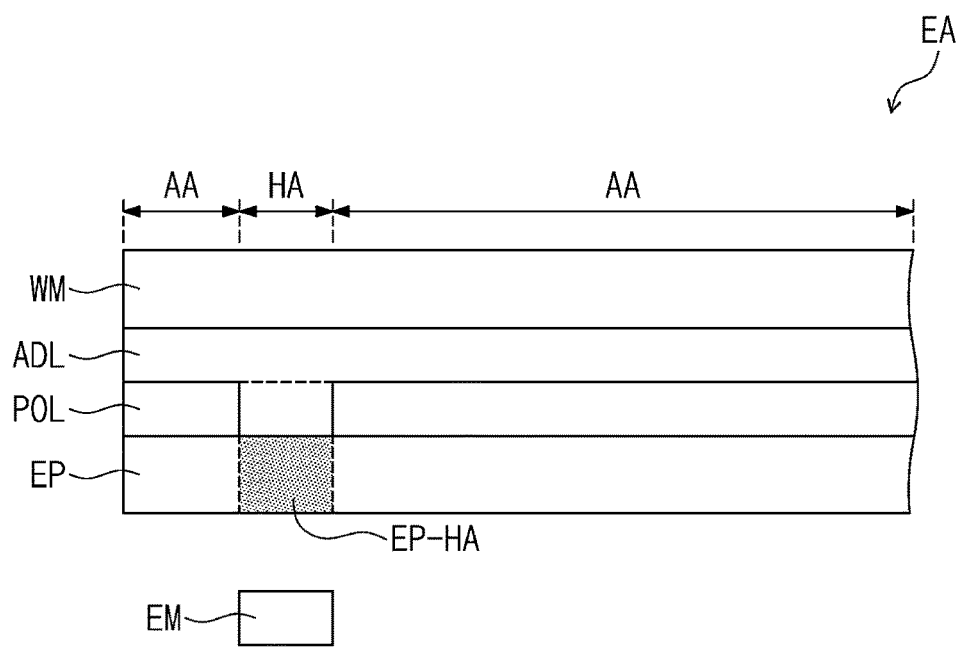

Referring to FIGS. 8D and 8E, in the method for manufacturing the electronic apparatus in an embodiment, after the window WM is disposed on the preliminary adhesive layer ADL-P, a process of applying heat HT to form an adhesive layer ADL may be performed. The adhesive layer ADL may be provided by thermally curing the preliminary adhesive layer ADL-P.

Figure 9A:
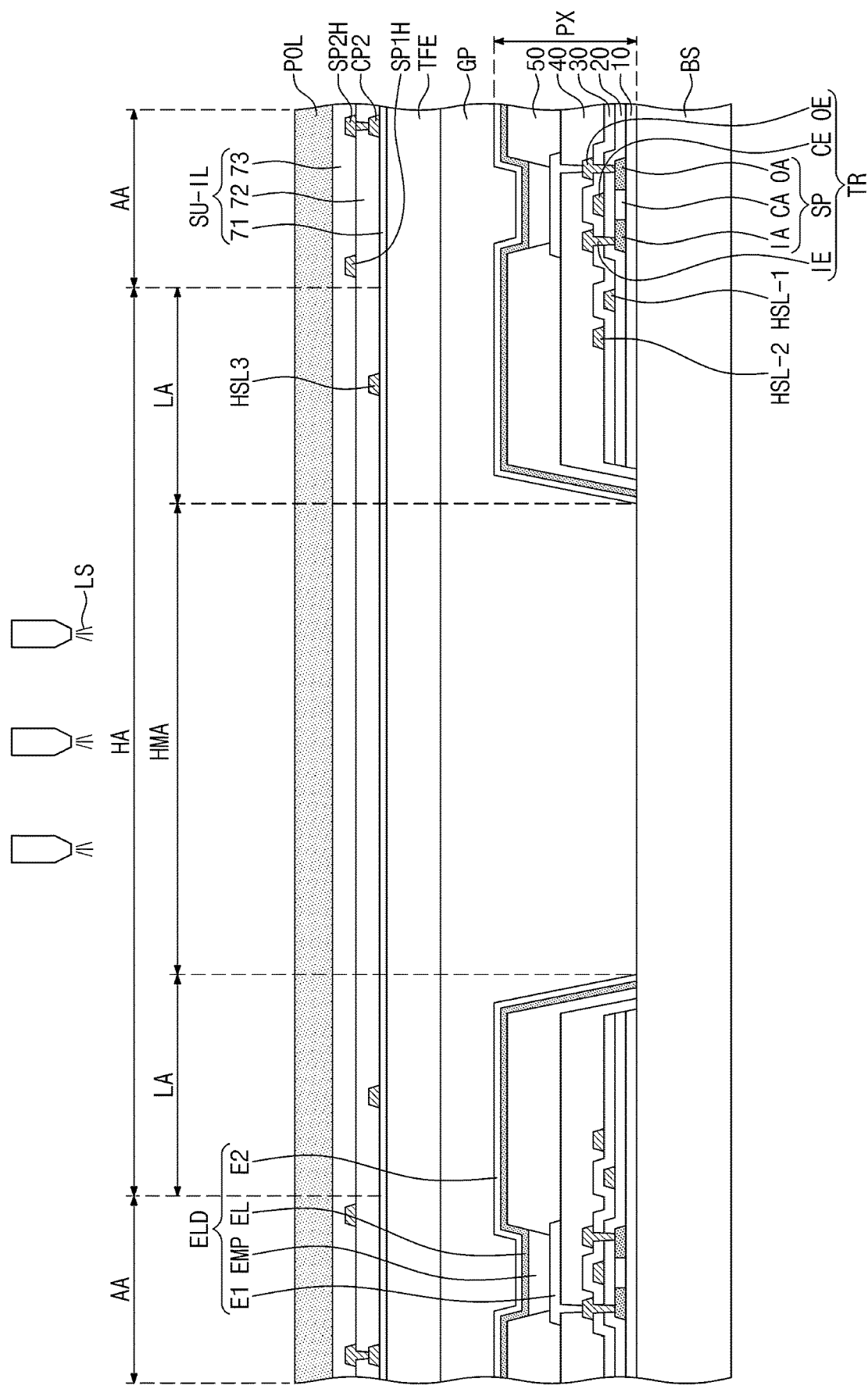
FIGS. 9A and 9B are cross-sectional views illustrating an embodiment of partial processes in the method for manufacturing the electronic apparatus according to the invention.
Figure 9B:
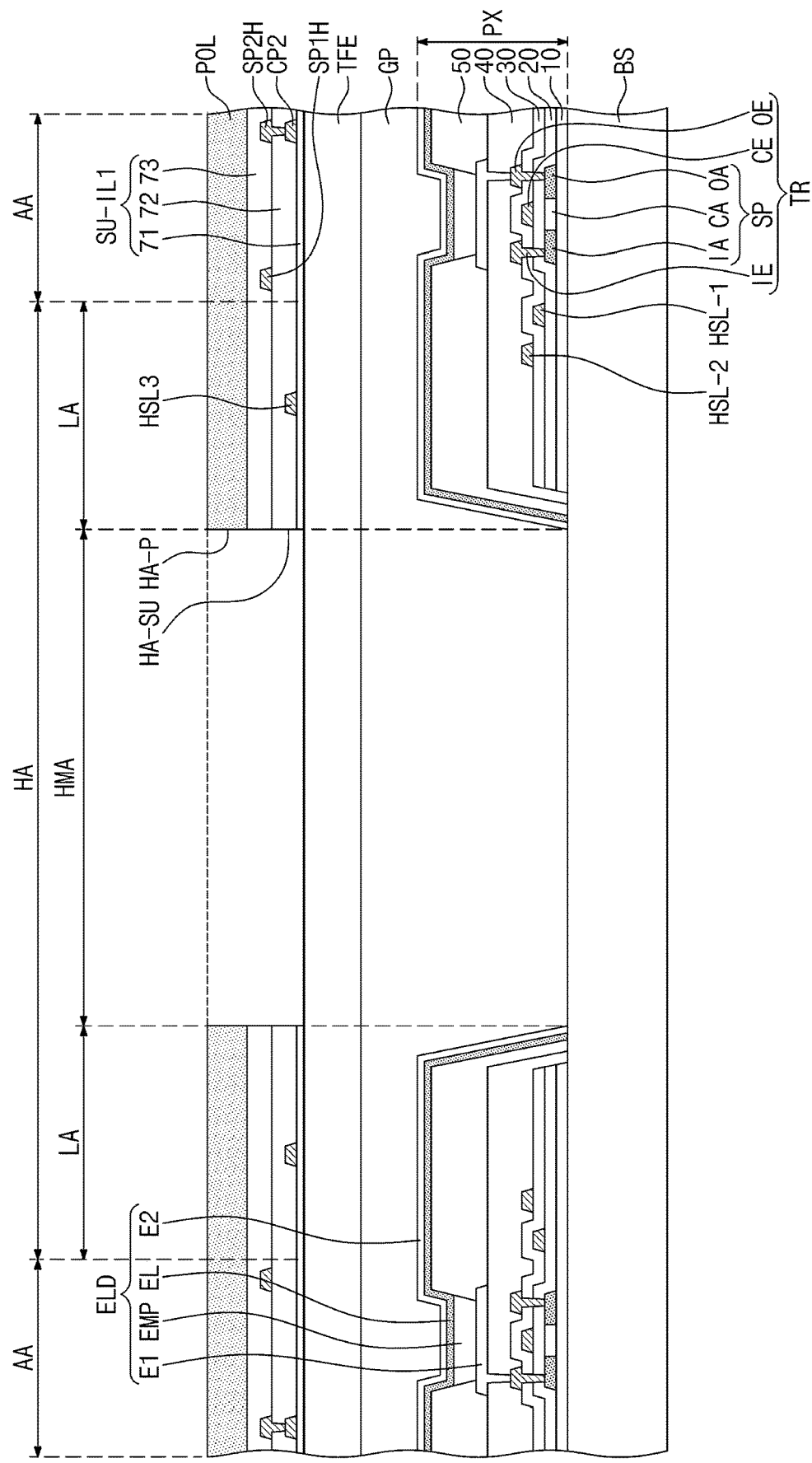

FIGS. 9A and 9B are cross-sectional views illustrating an embodiment of partial processes in the method for manufacturing the electronic apparatus according to the invention. FIGS. 9A and 9B illustrate partial processes in the method for manufacturing the electronic apparatus through a cross-section corresponding to the cross-section illustrated in FIG. 5B. FIGS. 9A and 9B illustrate the etching process using the laser LS in one process illustrated in FIG. 8A. Hereinafter, in describing the method for manufacturing the electronic apparatus in an embodiment of the invention with reference to FIGS. 9A and 9B, the same reference numerals will be assigned to the same constituents as those described above, and duplicated descriptions will be omitted.

Referring to FIGS. 8A, 9A, and 9B, in the method for manufacturing the electronic apparatus in an embodiment, the hole HA-P may be defined in the anti-reflection member POL through the laser LS. In the method for manufacturing the electronic apparatus in an embodiment, when forming the hole HA-P in the anti-reflection member POL through the laser LS, a sensing insulating layers SU-IL included in a sensing unit (e.g., "SU" in FIG. 3C) may be etched together to form an additional hole HA-SU. Also, in a central region HMA in which the hole HA-P is defined in the anti-reflection member POL, a portion of a plurality of first to fifth insulating layers 10, 20, 30, 40, and 50 included in the electronic panel EP (e.g. referring to FIG. 1B) and a control layer EL overlapping the central region HMA may be provided in an etched state. That is, before the anti-reflection member POL is provided on the electronic panel EP, the portion of the plurality of first to fifth insulating layers 10, 20, 30, 40, and 50 included in the electronic panel EP and the control layer EL overlapping the central region HMA may be etched, and then the anti-reflection member POL may be provided. As a result, the plurality of first to fifth insulating layers 10, 20, 30, 40, and 50 and the control layer EL may not overlap each other with the central region HMA in which the electronic module EM (refer to FIG. 5B) will be disposed in a later process, and the plurality of sensing insulating layers SU-IL1 may not overlap with the central region HMA. Therefore, a transmittance of the central region HMA may be improved, and functions of the electronic module EM may be improved.

In an embodiment according to the invention, the electronic module may overlap the electronic panel so as to reduce the bezel area. In addition, in an embodiment according to the invention, the transmittance of the light having the low wavelength range may be improved in the area, on which the electronic module is disposed, to improve the functions of the electronic module.

It will be apparent to those skilled in the art that various modifications and variations may be made in the inventive concept. Thus, it is intended that the disclosure covers the modifications and variations of this invention.

What is claimed is:
1. An electronic apparatus comprising:
an electronic module which outputs or receives a signal;
an electronic panel which is divided into a first area overlapping the electronic module, a second area surrounding at least a portion of the first area, and a third area adjacent to the second area in a plan view;
a window on the electronic panel;
an anti-reflection member between the window and the electronic panel; and
an adhesive layer between the window and the anti-reflection member,
wherein a hole which overlaps at least a portion of the first area is defined as a through-hole in the anti-reflection member, and
the adhesive layer fills the hole,
wherein the adhesive layer comprises:
a first adhesive pattern through which the window and the anti-reflection member are attached; and
a second adhesive pattern which fills the hole,
a depth of the hole of the anti-reflection member and a thickness of the second adhesive pattern are substantially the same,
the adhesive layer comprises an optically clear resin,
the second adhesive pattern filling the hole of the anti-reflection member and the first adhesive pattern through which the anti-reflection member and the window are attached are unitarily provided, and
wherein the electronic panel comprises a sensing unit comprising a plurality of conductive patterns and a plurality of sensing insulating layers between the plurality of conductive patterns,
an additional hole which overlaps at least a portion of the first area is defined as a through-hole in the plurality of sensing insulating layers, and
the second adhesive pattern fills the additional hole of the plurality of sensing insulating layers.

2. The electronic apparatus of claim 1, wherein the adhesive layer comprises an epoxy resin.

3. The electronic apparatus of claim 2, wherein the adhesive layer further comprises a thermosetting agent.

4. The electronic apparatus of claim 1, wherein the electronic panel further comprises:
a base substrate;
a plurality of pixels which is disposed on the base substrate and displays light on the second area; and
an encapsulation layer which is disposed on the base substrate and covers the plurality of pixels.

5. The electronic apparatus of claim 4, wherein the electronic panel further comprises a plurality of insulating layers on the base substrate, and
the plurality of insulating layers overlaps the second area and does not overlap the first area.

6. The electronic apparatus of claim 4, wherein the adhesive layer contacts a top surface of the encapsulation layer.

7. The electronic apparatus of claim 4, wherein the sensing unit is disposed on the encapsulation layer, and
the sensing insulating layers do not overlap the first area in the plan view.

8. The electronic apparatus of claim 4, wherein the encapsulation layer comprises:
a first inorganic layer;
a second inorganic layer on the first inorganic layer; and
an organic layer between the first inorganic layer and the second inorganic layer,
wherein the first inorganic layer does not overlap the first area in the plan view.

9. The electronic apparatus of claim 1, wherein the adhesive layer has a light transmittance equal to or greater than 92 percent in a wavelength range equal to or less than 430 nanometers.

10. An electronic apparatus comprising:
an electronic panel comprising a high transmission region and an active region surrounding at least a portion of the high transmission region in a plan view;
a window on the electronic panel;
an anti-reflection member between the window and the electronic panel; and
a thermosetting adhesive resin layer between the window and the anti-reflection member,
wherein a hole which overlaps at least a portion of the high transmission region is defined as a through-hole in the anti-reflection member, and
the thermosetting adhesive resin layer fills the hole,
wherein the adhesive layer comprises:
a first adhesive pattern through which the window and the anti-reflection member are attached; and
a second adhesive pattern which fills the hole,
a depth of the hole of the anti-reflection member and a thickness of the second adhesive pattern are substantially the same,
the adhesive layer comprises an optically clear resin,
the second adhesive pattern filling the hole of the anti-reflection member and the first adhesive pattern through which the anti-reflection member and the window are attached are unitarily provided, and
wherein the electronic panel comprises a sensing unit comprising a plurality of conductive patterns and a plurality of sensing insulating layers between the plurality of conductive patterns,
an additional hole which overlaps at least a portion of the first area is defined as a through-hole in the plurality of sensing insulating layers, and
the second adhesive pattern fills the additional hole of the plurality of sensing insulating layers.

11. A method for manufacturing an electronic apparatus, the method comprising:
preparing an electronic panel comprising a high transmission region and an active region surrounding at least a portion of the high transmission region;
defining a hole as a through-hole in an anti-reflection member such that at least a portion of the hole overlaps the high transmission region;
applying an adhesive resin to the anti-reflection member to fill the hole; and
attaching a window to the anti-reflection member through the adhesive resin,
wherein the adhesive layer comprises:
a first adhesive pattern through which the window and the anti-reflection member are attached; and
a second adhesive pattern which fills the hole,
a depth of the hole of the anti-reflection member and a thickness of the second adhesive pattern are substantially the same,
the adhesive layer comprises an optically clear resin,
the second adhesive pattern filling the hole of the anti-reflection member and the first adhesive pattern through which the anti-reflection member and the window are attached are unitarily provided, and
wherein the electronic panel comprises a sensing unit comprising a plurality of conductive patterns and a plurality of sensing insulating layers between the plurality of conductive patterns,
an additional hole which overlaps at least a portion of the first area is defined as a through-hole in the plurality of sensing insulating layers, and
the second adhesive pattern fills the additional hole of the plurality of sensing insulating layers.

12. The method of claim 11, wherein the adhesive resin comprises a thermosetting resin, and
the attaching the window comprises thermally curing the adhesive resin.

13. The method of claim 12, wherein the adhesive resin further comprises a thermosetting agent.

14. The method of claim 11, wherein the applying the adhesive resin is performed through an inkjet method.

15. The method of claim 11, wherein the electronic panel further comprises a base substrate and a plurality of insulating layers on the base substrate, and
the preparing the electronic panel comprises patterning the plurality of insulating layers overlapping the high transmission region.

16. The method of claim 15, wherein the patterning the plurality of insulating layers and the defining the hole of the anti-reflection member are performed through a same process.

* * * * *